US010257381B2

(12) United States Patent
Fujisawa

(10) Patent No.: US 10,257,381 B2
(45) Date of Patent: Apr. 9, 2019

(54) IMAGE FORMING APPARATUS CAPABLE OF BEING SET TO POWER SAVING MODE, METHOD OF CONTROLLING THE SAME, AND STORAGE MEDIUM

(71) Applicant: CANON KABUSHIKI KAISHA, Tokyo (JP)

(72) Inventor: Minoru Fujisawa, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/471,301

(22) Filed: Mar. 28, 2017

(65) Prior Publication Data

US 2017/0201646 A1 Jul. 13, 2017

Related U.S. Application Data

(63) Continuation of application No. 15/149,233, filed on May 9, 2016, now Pat. No. 9,648,188.

(30) Foreign Application Priority Data

May 11, 2015 (JP) ................................ 2015-096511

(51) Int. Cl.
*H04N 1/333* (2006.01)
*H04N 1/00* (2006.01)
*H04N 1/327* (2006.01)

(52) U.S. Cl.
CPC ..... *H04N 1/33323* (2013.01); *H04N 1/00891* (2013.01); *H04N 1/00896* (2013.01); *H04N 1/32795* (2013.01); *H04N 2201/0094* (2013.01)

(58) Field of Classification Search
USPC ........................................................ 358/1.13
See application file for complete search history.

(56) References Cited

U.S. PATENT DOCUMENTS 6,813,037 B1 11/2004 Collard
7,117,384 B2 10/2006 Chen et al.
(Continued)

FOREIGN PATENT DOCUMENTS

JP 2001154763 A 6/2001
JP 2011123738 A 6/2011
(Continued)

OTHER PUBLICATIONS

Notice of Allowance issued in U.S. Appl. No. 15/149,233 dated Dec. 30, 2016.

(Continued)

*Primary Examiner* — Jerome Grant, II
(74) *Attorney, Agent, or Firm* — Rossi, Kimms & McDowell LLP

(57) ABSTRACT

An image forming apparatus that causes a user's will concerning which of a communication speed and power saving efficiency is given priority to be reflected on determination of a power saving mode. In shifting the apparatus to a power saving mode, a first setting inhibits disconnection of a communication link and a second setting indicates changing communication speed to a lower speed. One of the first and second settings is made according to a user's instruction. In the first setting, the apparatus is shifted to a first power saving mode. In the second setting, the apparatus is shifted to a second power saving mode. When the apparatus is shifted to the first power saving mode, the communication link is not disconnected. When the apparatus is shifted to the second power saving mode, the communication speed of the apparatus is changed to the lower speed.

9 Claims, 19 Drawing Sheets

START
RECEIVE POWER MODES TO WHICH IMAGE FORMING APPARATUS CAN BE SHIFTED — S201
SELECT POWER MODE LOWEST IN POWER SAVING EFFICIENCY — S202
POWER SAVING MODE SELECTED? — S203 (NO / YES)
SELECT MODE LOWER IN POWER SAVING EFFICIENCY FROM SELECTED MODE AND MODE INDICATED BY POWER SAVING SETTING — S204
POWER SAVING MODE M4 OR POWER SAVING MODE M5 SELECTED? — S205 (NO / YES)
NOTIFY POWER MODE CONTROLLER THAT IMAGE FORMING APPARATUS IS TO BE SHIFTED TO (SPECIFIC) POWER SAVING MODE — S206
PERFORM PROCESS FOR SHIFTING TO POWER SAVING MODE — S207
STOP ENERGIZATION OF POWER BLOCKS — S208
END

(56) References Cited

U.S. PATENT DOCUMENTS

| | | | | |
|---|---|---|---|---|
| 9,019,540 | B2 | 4/2015 | Tamura | |
| 9,244,675 | B2 | 1/2016 | Tsuji | |
| 2009/0248890 | A1* | 10/2009 | Shouno | H04N 1/00204 709/232 |
| 2010/0284038 | A1* | 11/2010 | Hosogoshi | H04L 12/12 358/1.15 |
| 2011/0126036 | A1 | 5/2011 | Hayakawa | |
| 2012/0069387 | A1* | 3/2012 | Siddle | G06F 1/3284 358/1.15 |
| 2012/0162710 | A1 | 6/2012 | Kawabata et al. | |
| 2013/0031395 | A1* | 1/2013 | Yamada | H04L 12/12 713/323 |
| 2013/0135669 | A1 | 5/2013 | Ide | |
| 2014/0347685 | A1 | 11/2014 | Hisada | |
| 2015/0172497 | A1 | 6/2015 | Sato | |
| 2015/0212573 | A1 | 7/2015 | Bradford et al. | |
| 2015/0237228 | A1 | 8/2015 | Okuzono | |
| 2016/0036596 | A1 | 2/2016 | Fukushima et al. | |
| 2016/0105581 | A1 | 4/2016 | Hikichi | |
| 2016/0337540 | A1 | 11/2016 | Fujisawa | |

FOREIGN PATENT DOCUMENTS

| | | | |
|---|---|---|---|
| JP | 2014008671 | A | 1/2014 |
| JP | 2014090360 | A | 5/2014 |

OTHER PUBLICATIONS

Office Action issued in Japanese Appln. No. 2015-096511 dated Oct. 16, 2018.

Office Action issued in Japanese Appin. No. 2015-096511 dated Dec. 18, 2018.

* cited by examiner

101
IMAGE FORMING APPARATUS
210
INFORMATION PROCESSING DEVICE
211 CPU
212 ROM
213 NVRAM
214 HDD
215 EXPANSION I/F
216 RAM
217 CONSOLE SECTION I/F
218 SCANNER I/F
219 SCANNER IMAGE PROCESSOR
220 PRINTER I/F
221 PRINTER IMAGE PROCESSOR
222 USB I/F
223 MODEM I/F
224 POWER SUPPLY CONTROLLER
240 CONSOLE SECTION
250 SCANNER
260 PRINTER
270 USB
280 FAX
290 POWER SUPPLY
230
NIC
231 CPU
232 EXPANSION I/F
233 ROM
234 RAM
235 NETWORK I/F
103
NET

101
IMAGE FORMING APPARATUS
310
INFORMATION PROCESSING DEVICE
210
313
211
CPU
217
CONSOLE SECTION I/F
240
CONSOLE SECTION
212
ROM
314
230
NIC
218
SCANNER I/F
250
SCANNER
213
NVRAM
231
CPU
214
HDD
219
SCANNER IMAGE PROCESSOR
232
EXPANSION I/F
215
EXPANSION I/F
315
220
PRINTER I/F
260
PRINTER
233
ROM
234
RAM
216
RAM
221
PRINTER IMAGE PROCESSOR
235
NETWORK I/F
311
316
222
USB I/F
270
USB
312
317
223
MODEM I/F
280
FAX
318
224
POWER SUPPLY CONTROLLER
290
POWER SUPPLY
103
NET

101
IMAGE FORMING APPARATUS
103
NET
210
INFORMATION PROCESSING DEVICE
313
240
CONSOLE SECTION
314
250
SCANNER
315
260
PRINTER
316
270
USB
317
280
FAX
290
POWER SUPPLY
217
CONSOLE SECTION I/F
218
SCANNER I/F
219
SCANNER IMAGE PROCESSOR
220
PRINTER I/F
221
PRINTER IMAGE PROCESSOR
222
USB I/F
223
MODEM I/F
224
POWER SUPPLY CONTROLLER
310
211
CPU
212
ROM
213
NVRAM
214
HDD
215
EXPANSION I/F
216
RAM
311
230
NIC
312
231
CPU
232
EXPANSION I/F
233
ROM
234
RAM
235
NETWORK I/F
318

FIG. 20A

TABLE 1

| POWER BLOCK | 310 | 311 | 312 | 313 | 314 | 315 | 316 | 317 | NETWORK COMMUNICATION SPEED |
|---|---|---|---|---|---|---|---|---|---|
| NORMAL POWER MODE | ENER-GIZED | ENER-GIZED | ENER-GIZED | ENER-GIZED | ENER-GIZED | ENER-GIZED | ENER-GIZED | ENER-GIZED | 1Gpbs |
| POWER SAVING MODE M1 | ENER-GIZED | ENER-GIZED | ENER-GIZED | STOPPED | ENER-GIZED | ENER-GIZED | ENER-GIZED | ENER-GIZED | 1Gpbs |
| POWER SAVING MODE M2 | ENER-GIZED | ENER-GIZED | ENER-GIZED | STOPPED | STOPPED | STOPPED | ENER-GIZED | ENER-GIZED | 1Gpbs |
| POWER SAVING MODE M3 | ENER-GIZED | ENER-GIZED | ENER-GIZED | STOPPED | STOPPED | STOPPED | STOPPED | ENER-GIZED | 1Gpbs |
| POWER SAVING MODE M4 | STOPPED | ENER-GIZED | ENER-GIZED | STOPPED | STOPPED | STOPPED | STOPPED | STOPPED | 1Gpbs |
| POWER SAVING MODE M5 | STOPPED | ENER-GIZED | ENER-GIZED | STOPPED | STOPPED | STOPPED | STOPPED | STOPPED | 10MbpsHalf |

FIG. 20B

TABLE 2

| PROCESSOR | 410 | 411 | 412 | 413 | 414 | 415 |
|---|---|---|---|---|---|---|
| POWER MODE | NORMAL POWER MODE | POWER SAVING MODE M3 | POWER SAVING MODE M5 | POWER SAVING MODE M5 | POWER SAVING MODE M2 | POWER SAVING MODE M3 |

FIG. 20C

TABLE 3

| RETURN FACTOR | RETURN DESTINATION POWER MODE |
|---|---|
| CONSOLE SECTION | NORMAL POWER MODE |
| FAX | POWER SAVING MODE M1 |
| USB | POWER SAVING MODE M2 |
| NETWORK | POWER SAVING MODE M2 |

IMAGE FORMING APPARATUS CAPABLE OF BEING SET TO POWER SAVING MODE, METHOD OF CONTROLLING THE SAME, AND STORAGE MEDIUM

BACKGROUND OF THE INVENTION

Field of the Invention

The present invention relates to a power saving technique for an image forming apparatus connected to a network via a communication section.

Description of the Related Art

Conventionally, there has been known an image forming apparatus connected to a network via a communication device, such as a NIC (Network Interface Card). In general, the image forming apparatus of this type has operating power modes, i.e. a normal power mode and a power saving mode smaller in power consumption than the normal power mode. When the image forming apparatus shifts from a normal operation state in which it is operated in the normal power mode, to a power saving state in which it is operated in the power saving mode, a communication speed is sometimes changed in order to reduce as much electric power being used as possible.

For example, in the power saving state, compared with the normal operation state, the communication speed of a network communication link between the image forming apparatus and a counter device (switching device such as a HUB) as a communication partner is changed to a lower speed. This is because as the communication speed of the network communication link is higher, a larger amount of power is consumed. In general, in the normal operation state, the communication is performed at 1 Gbps (Giga bits/sec) or 100 Mbps (Mega bits/sec) full-duplex. On the other hand, in the power saving state, the communication speed is changed to 10 Mbps half-duplex, whereby the power consumption in the power saving state is reduced.

In a case where a network packet e.g. of a print job is received in the power saving state, the image forming apparatus returns from the power saving state to the normal operation state, and then performs print processing. Packets transmitted via the network to the image forming apparatus are sometimes those of large-volume data, and hence it is necessary to perform higher-speed communication after the image forming apparatus is returned to the normal operation state. This requires the communication speed of the network communication link in the power saving state to be returned to a higher communication speed than in the normal operation state, and a technique meeting the requirement is known (Japanese Patent Laid-Open Publication No. 2014-90360).

To change the communication speed of the network communication link, it is necessary to temporarily disconnect the communication link whenever the speed is changed, and establish the communication link again at a changed speed. In general, when a communication link is established, there is a case where it takes time to establish the communication link depending on the compatibility between the image forming apparatus and a counter device. Further, depending on a network through which a communication link is established, it sometimes takes time to establish the communication link before a counter device improves the network environment using a spanning tree protocol. In a case where a print request is received when in the power saving state, the image forming apparatus returns to the normal operation state capable of performing print processing, and waits for the communication link to be established before starting to receive print data transmitted subsequently. This can lower the overall performance of the print processing, and depending on the case, print data cannot be received, and communication connection with a terminal having issued the print request can time out.

On the other hand, there has been proposed a method of maintaining the speed of a communication link in the normal operation state without changing the same, when shifting the image forming apparatus to the power saving state. According to this method, a larger amount of power is consumed even in the power saving state since the high-speed communication link is maintained. However, on the other hand, when the image forming apparatus returns to the normal operation state, it is possible to prevent network processing performance from being degraded, since it is unnecessary to temporarily disconnect the communication link so as to change the speed thereof.

More specifically, when the communication speed of the network communication link is lowered when the image forming apparatus is shifted to the power saving state, it is possible to improve power saving effects, but time taken for print processing is adversely affected since it takes time for the image forming apparatus to return to the normal operation state. On the other hand, when the image forming apparatus is shifted to the power saving state while maintaining the communication speed of the network communication link in the normal operation state, it is possible to reduce wasteful time in print processing which is wasted during returning the image forming apparatus to the normal operation state, but this results in reduced power saving effects (power saving efficiency). As described above, depending on a user of the image forming apparatus who has made the print request or office environments, it is impossible to univocally determine whether to give priority to power saving or to print processing speed including network processing performance, and which of the two choices is appropriate. Particularly, it is sometimes inappropriate to uniformly determine the priority regardless of user's will.

SUMMARY OF THE INVENTION

The present invention provides an image forming apparatus that causes, when determining a power saving mode, user's will concerning which of a communication speed and power saving efficiency should be given priority, to be reflected on the determination, a method of controlling the same, and a storage medium.

In a first aspect of the present invention, there is provided an image forming apparatus comprising a setting unit configured to make, according to a user's instruction, one of a first setting indicating that disconnection of a communication link is not to be performed when the image forming apparatus is shifted to a power saving mode, and a second setting indicating that a communication speed is to be changed to a lower speed when the image forming apparatus is shifted to a power saving mode, and a control unit configured to cause the image forming apparatus to be shifted to a first power saving mode in a case where the first setting has been made by the setting unit, and cause the image forming apparatus to be shifted to a second power saving mode in a case where the second setting has been made by the setting unit, wherein in a case where the image forming apparatus is shifted to the first power saving mode, disconnection of the communication link is not performed, and wherein in a case where the image forming apparatus is shifted to the second power saving mode, the communication speed of the image forming apparatus is changed to the lower speed.

In a second aspect of the present invention, there is provided a method of controlling an image forming apparatus, comprising making, according to a user's instruction, one of a first setting indicating that disconnection of a communication link is not to be performed when the image forming apparatus is shifted to a power saving mode, and a second setting indicating that a communication speed is to be changed to a lower speed when the image forming apparatus is shifted to a power saving mode, causing the image forming apparatus to be shifted to a first power saving mode in a case where the first setting has been made by said setting, and causing the image forming apparatus to be shifted to a second power saving mode in a case where the second setting has been made by said setting, inhibiting, in a case where the image forming apparatus is shifted to the first power saving mode, disconnection of the communication link, and changing, in a case where the image forming apparatus is shifted to the second power saving mode, the communication speed of the image forming apparatus to the lower speed.

In a third aspect of the present invention, there is provided a non-transitory computer-readable storage medium storing a computer-executable program for executing a method of controlling an image forming apparatus, wherein the method comprises making, according to a user's instruction, one of a first setting indicating that disconnection of a communication link is not to be performed when the image forming apparatus is shifted to a power saving mode, and a second setting indicating that a communication speed is to be changed to a lower speed when the image forming apparatus is shifted to a power saving mode, causing the image forming apparatus to be shifted to a first power saving mode in a case where the first setting has been made by said setting, and causing the image forming apparatus to be shifted to a second power saving mode in a case where the second setting has been made by said setting, inhibiting, in a case where the image forming apparatus is shifted to the first power saving mode, disconnection of the communication link, and changing, in a case where the image forming apparatus is shifted to the second power saving mode, the communication speed of the image forming apparatus to the lower speed.

According to the present invention, it is possible to cause, when determining a power saving mode, the user's will concerning which of the communication speed and the power saving efficiency should be given priority, to be reflected on the determination.

Further features of the present invention will become apparent from the following description of exemplary embodiments (with reference to the attached drawings).

BRIEF DESCRIPTION OF THE DRAWINGS

FIG. 20A is a table showing a list of power states and communication speeds in respective power modes.

FIG. 20B is a table of information on shiftable operating power modes.

FIG. 20C is a table showing an example of a relationship between power mode return factors and return destination power modes to which the image forming apparatus returns from the specific power saving modes.

DESCRIPTION OF THE EMBODIMENTS

The present invention will now be described in detail below with reference to the accompanying drawings showing embodiments thereof.

Figure 1:
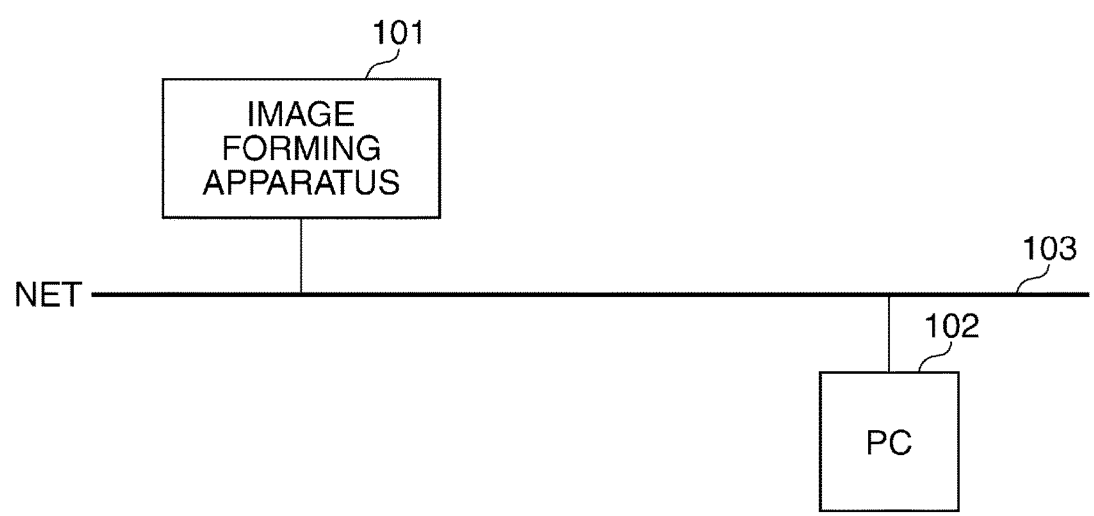
FIG. 1 is a diagram showing the general configuration of an image forming system including an image forming apparatus according to a first embodiment of the present invention.

FIG. 1 is a diagram showing the general configuration of an image forming system including an image forming apparatus according to a first embodiment of the present invention. In the image forming system, the image forming apparatus 101 and at least one PC 102 are connected via a network (NET) 103 such that they can communicate with each other.

Figure 2:
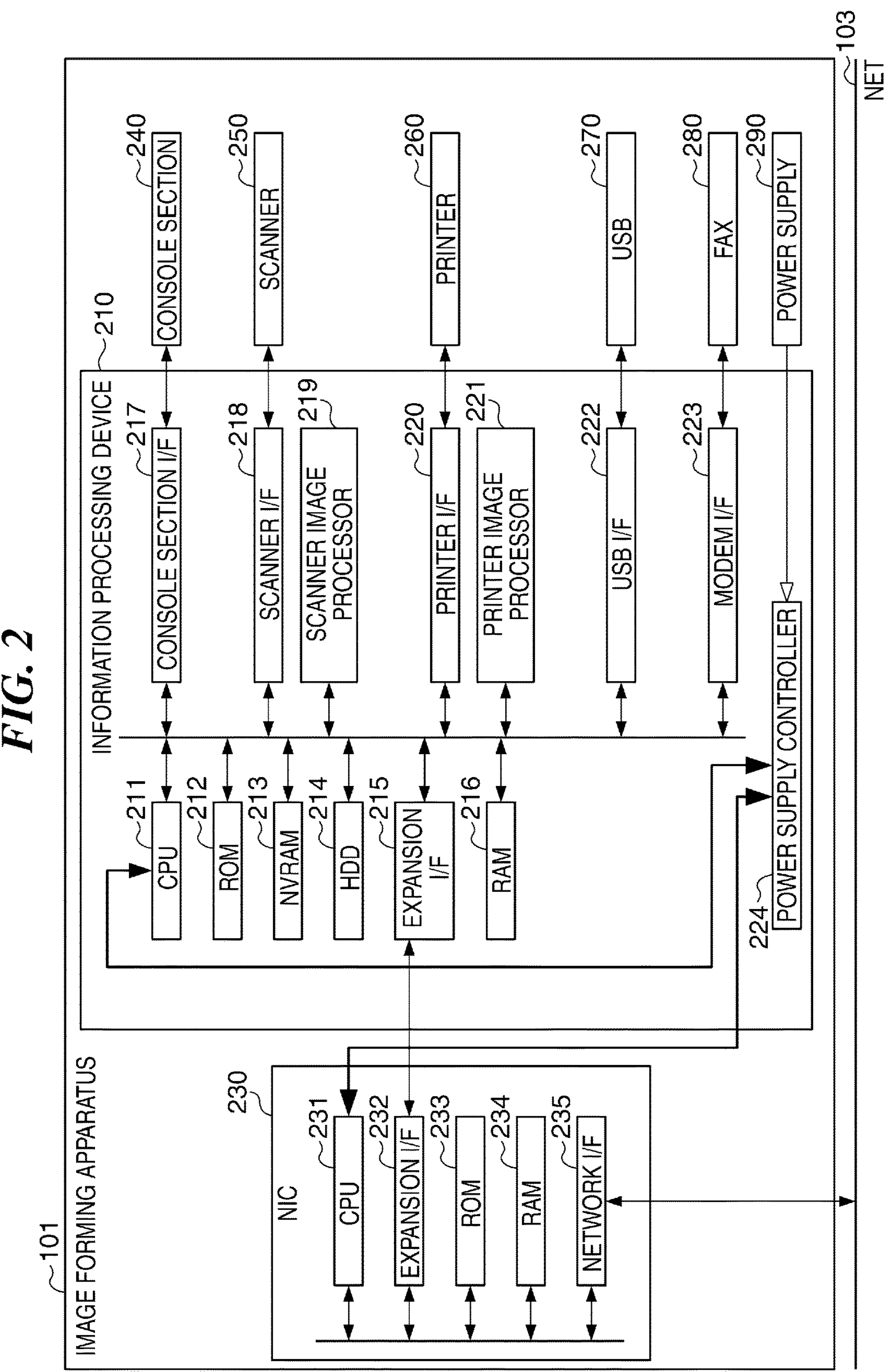
FIG. 2 is a block diagram of the hardware configuration of the image forming apparatus appearing in FIG. 1.

FIG. 2 is a block diagram of the hardware configuration of the image forming apparatus 101. The image forming apparatus 101 includes an information processing device 210 and a NIC (Network Interface Card) 230. The information processing device 210 is connected to the network 103 via the NIC 230 as a communication section. A CPU 211 executes software programs of the information processing device 210, and controls the overall operation of the image forming apparatus 101. A ROM (Read Only Memory) 212 stores a boot program, fixed parameters of the information processing device 210, and so forth. An NVRAM 213 is a nonvolatile memory, and stores various settings of the information processing device 210. An HDD (Hard Disk Drive) 214 is used for storing various data. A RAM (Random Access Memory) 216 is used e.g. for temporarily storing data and performing various task processes after the start of firmware of the apparatus, when the CPU 211 controls the image forming apparatus 101.

A console section interface 217 controls a console section 240 to display various operation screens on a liquid crystal display provided in the console section 240, and transmits instructions input via the operation screens to the CPU 211. A scanner interface 218 controls a scanner 250. The scanner 250 reads an image on an original, and generates image data. A scanner image processor 219 corrects, manipulates, edits, or performs other processing on input image data read by the scanner 250. A printer interface 220 controls a printer 260. The printer 260 prints an image based on image data on a recording medium. A printer image processor 221 performs color conversion, filtering, resolution conversion, or other processing on image data to be output to the printer 260. A USB (Universal Serial Bus) interface 222 controls a USB connector 270. The USB connector 270 recognizes a non-volatile USB storage device inserted therein from the outside, and controls a file system in the USB storage device in cooperation with the USB interface 222, to thereby recognize files and directories in the USB storage device. A modem interface 223 controls a FAX 280. The FAX 280 is a facsimile functional section, and has functions of a modem, a voice CODEC, a NCU (Network Control UNIT), and a telephone.

A power supply controller 224 receives DC power from a power supply 290 via a power supply line. The power supply controller 224 supplies the received DC power to circuits and functional elements, such as the information processing device 210, the NIC 230, the console section 240, the scanner 250, the printer 260, the USB connector 270, and the FAX 280. Further, the power supply controller 224 is capable of exchanging control signals with the CPU 211 and a CPU 231, referred to hereinafter, and controls power supply to the circuits and the functional elements based on the control signals. An expansion interface 215 is connected to an expansion interface 232 of the NIC 230, and controls data communication with external apparatuses (the PC 102, etc.) on the network 103 via the NIC 230.

In the NIC 230, the CPU 231 executes software programs of the NIC 230, and controls the overall operation of the NIC 230. The expansion interface 232 is connected to the expansion interface 215 of the information processing device 210, and controls data communication between the information processing device 210 and the NIC 230. A ROM 233 stores a boot program, fixed parameters of the NIC 230, and so forth. A RAM 234 is used by the CPU 231 e.g. for temporarily storing data when the CPU 231 controls the NIC 230. A network interface 235 is connected to the network 103, and controls data communication between the NIC 230 and external apparatuses on the network 103, and data communication between the information processing device 210 and the external apparatuses on the network 103 via the NIC 230.

The power supply controller 224 controls a power supply state of the image forming apparatus 101, and is capable of switching between operating power modes associated with power supply states of the image forming apparatus 101 in operation. The operating power modes include a normal power mode, and a plurality of power saving modes which are low in power consumption than the normal power mode. The power saving modes include power saving modes M1, M2, M3, M4, and M5 in an increasing order of power saving efficiency (in a decreasing order of power consumption). These various power modes will be described hereinafter with reference to FIGS. 3 to 7.

Figure 3:
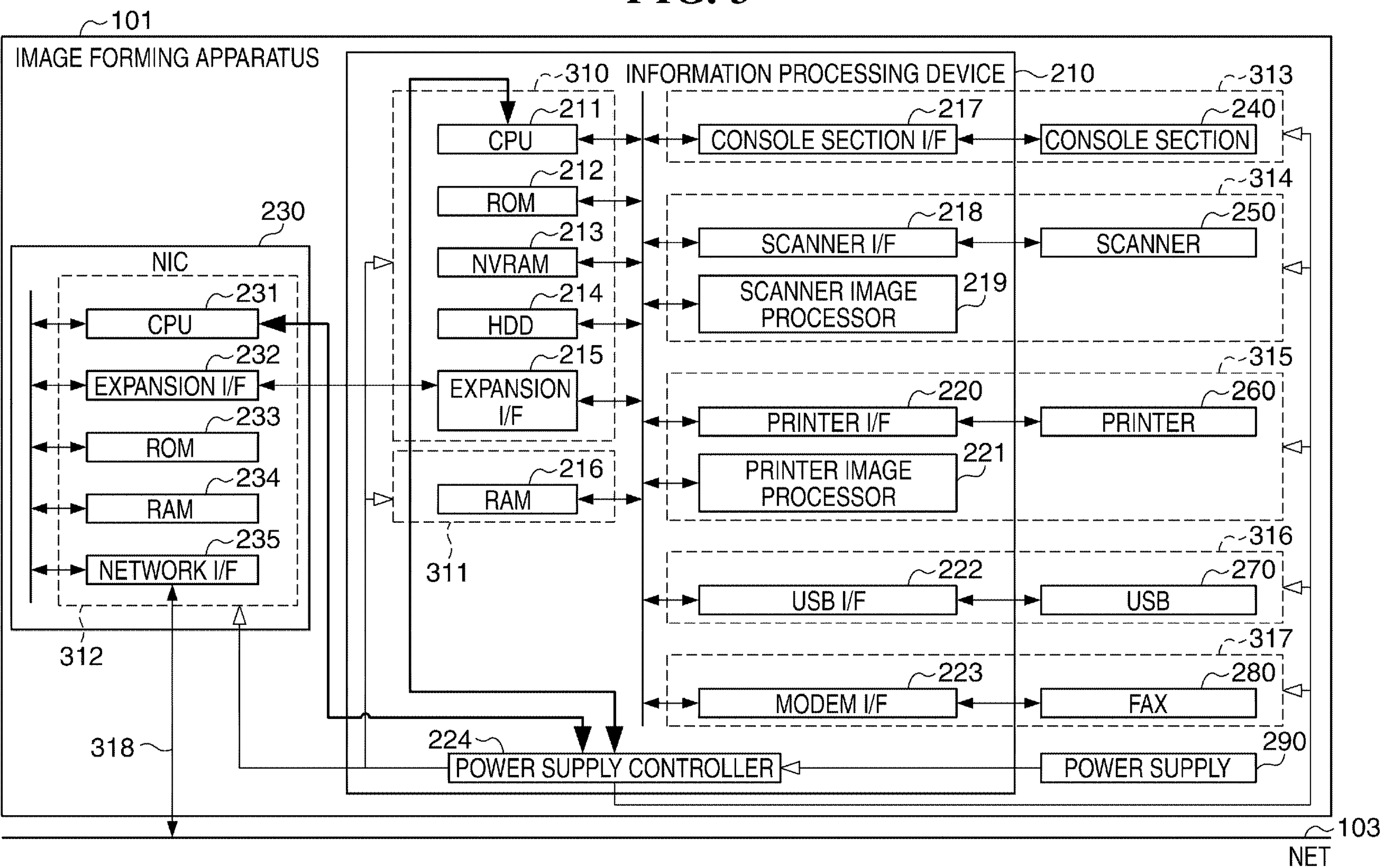
FIG. 3 is a block diagram showing a power supply state of the image forming apparatus in a normal power mode.
Figure 4:
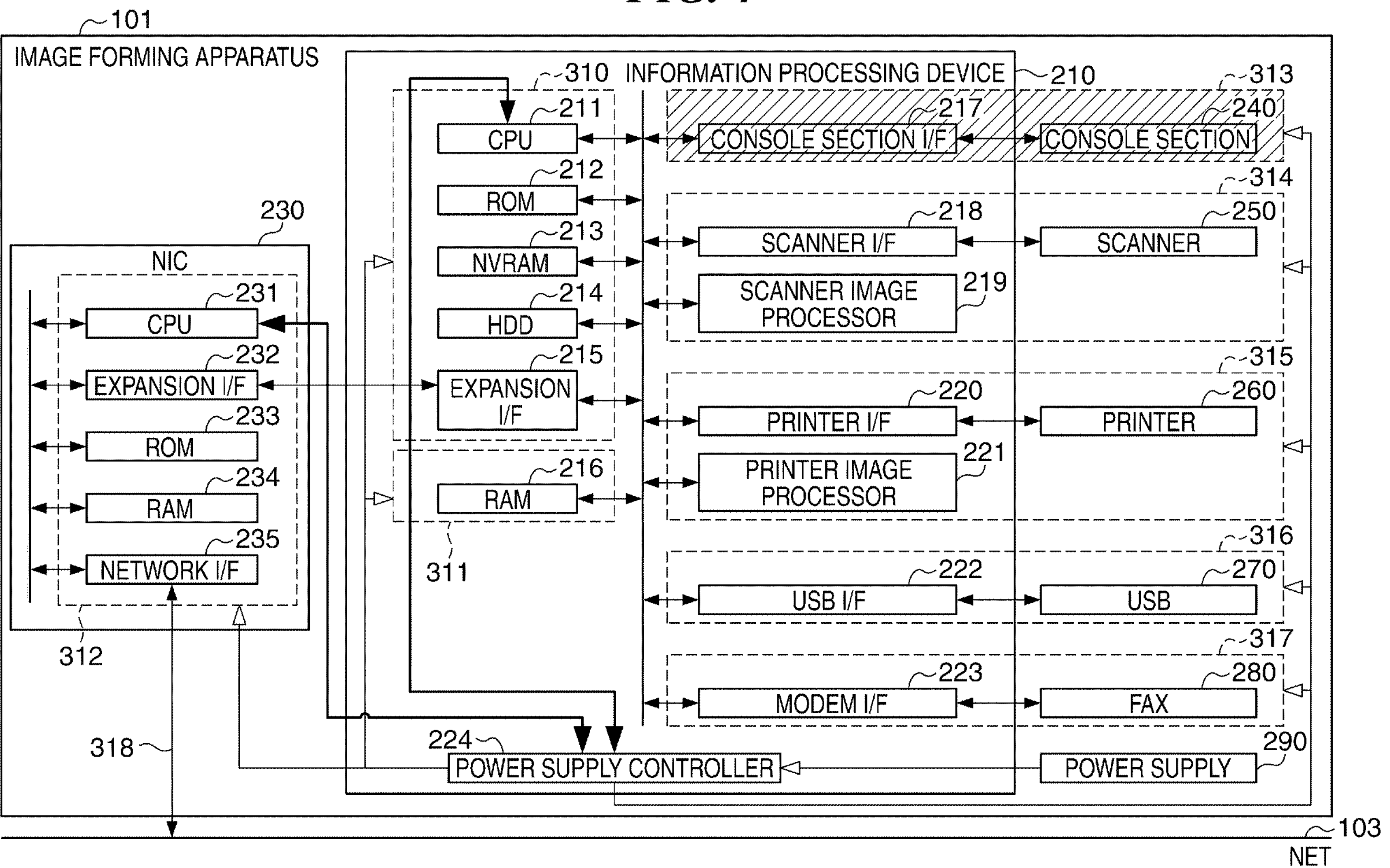
FIG. 4 is a block diagram showing a power supply state of the image forming apparatus in a power saving mode.
Figure 5:
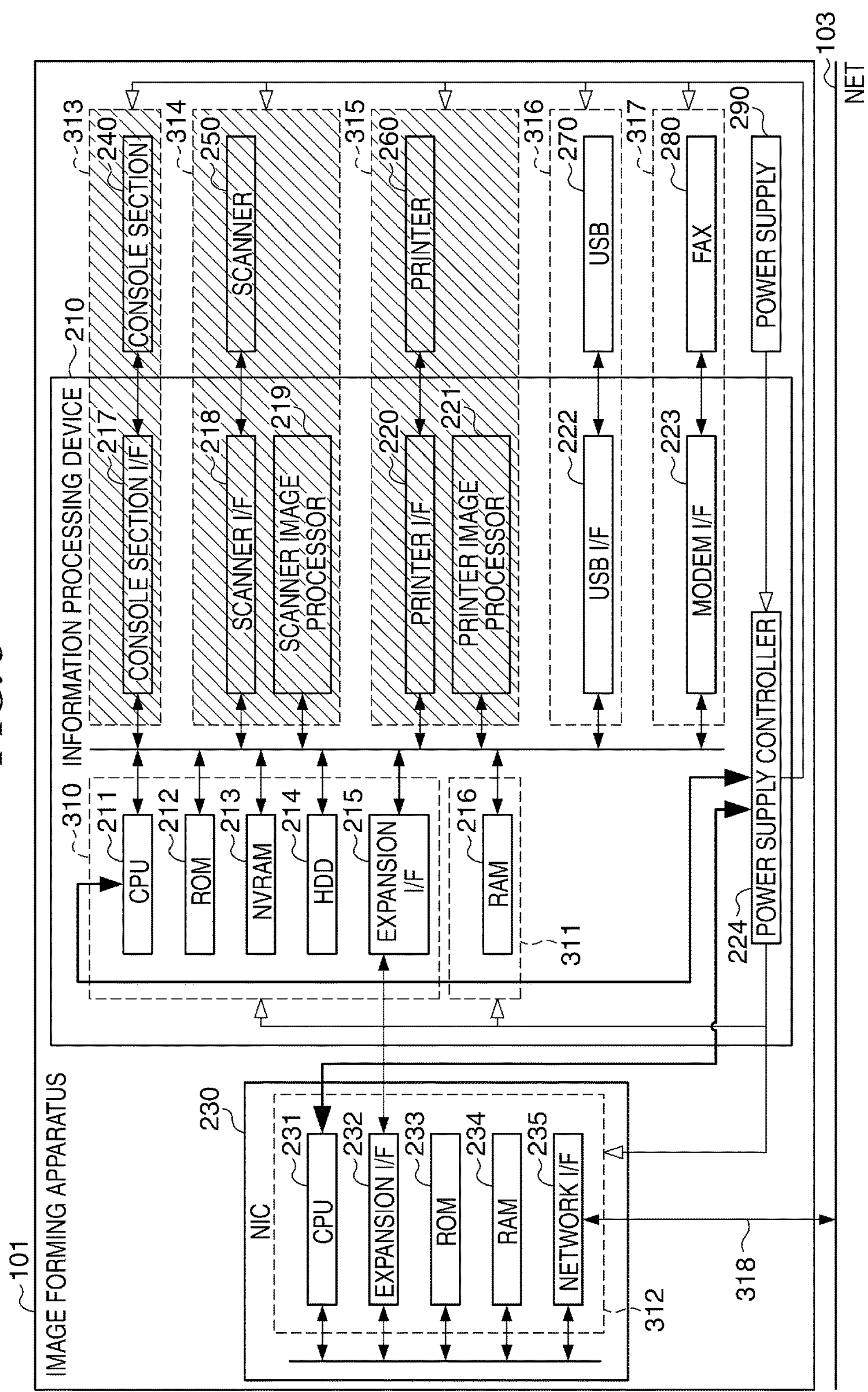
FIG. 5 is a block diagram showing a power supply state of the image forming apparatus in another power saving mode.
Figure 6:
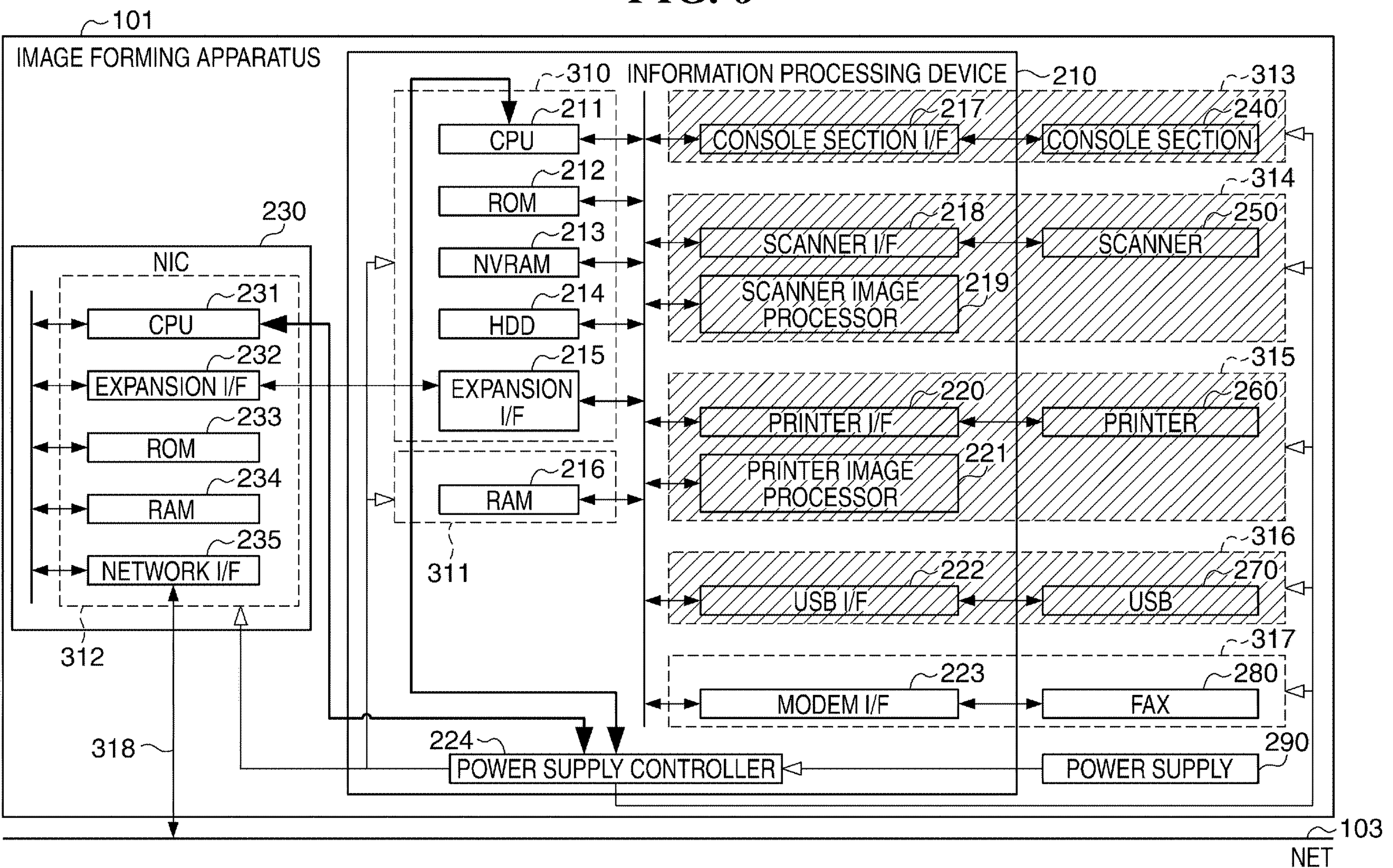
FIG. 6 is a block diagram showing a power supply state of the image forming apparatus in another power saving mode.
Figure 7:
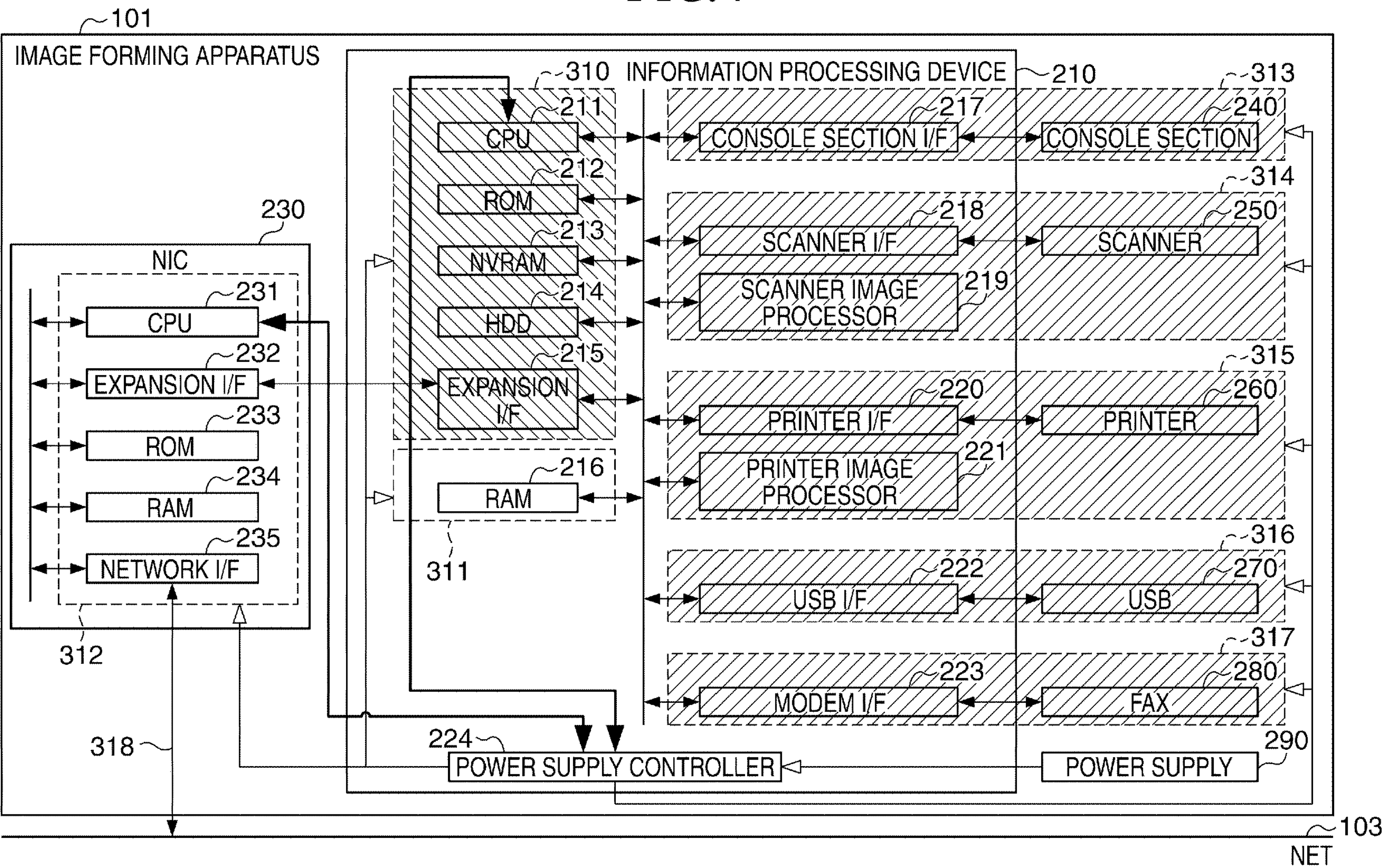
FIG. 7 is a block diagram showing a power supply state of the image forming apparatus in specific power saving modes.

FIGS. 3 to 7 are block diagrams showing power supply states of the image forming apparatus 101 in respective power modes. In FIGS. 3 to 7, the circuits and the functional elements within the image forming apparatus 101 are shown in a manner distinguishing between power blocks as units to which electric power is supplied. FIG. 3 shows a power supply state in the normal power mode, and FIGS. 4, 5, and 6 show power supply states in the power saving modes M1, M2, and M3, respectively. FIG. 7 shows power supply states in the power saving modes M4 and M5. Note that in FIGS. 3 to 7, power blocks to which power supply is stopped are indicated by hatching.

Referring to FIG. 3, the power blocks include power blocks 310, 311, 312, 313, 314, 315, 316, and 317. The power supply controller 224 is capable of supplying power to the respective power blocks 310 to 317, and stopping the supply of power thereto, as required. First, the power block 310 includes the CPU 211, the ROM 212, the NVRAM 213, the HDD 214, and the expansion interface 215, which function as the main controller of the information processing device 210. The power block 311 includes the RAM 216. The power block 312 as a power block of the NIC 230 includes the CPU 231, the expansion interface 232, the ROM 233, the RAM 234, and the network interface 235.

The power block 313 as a power block of a user interface part includes the console section interface 217 and the console section 240. The power block 314 as a power block of a scan function section includes the scanner interface 218, the scanner image processor 219, and the scanner 250. The power block 315 as a power block of a printer function section includes the printer interface 220, the printer image processor 221, and the printer 260. The power block 316 as a power block of a USB function section includes the USB interface 222 and the USB connector 270. The power block 317 as a power block of the facsimile functional section includes the modem interface 223 and the FAX 280. The power supply controller 224 supply power to all the power blocks 310 to 317. A power state of the image forming apparatus 101 in a standby state is the normal power mode.

The power saving mode M1 shown in FIG. 4 is distinguished from the normal power mode (FIG. 3) in that the power supply to the power block 313 is stopped. Although in this state, the lighting of the user interface part of the image forming apparatus 101 is turned off, functions of the image forming apparatus 101, such as a scan function, a print function, a USB function (processing for inputting and outputting information using a medium or the like), a FAX reception function, and a network transmission/reception function, can operate.

In the power saving mode M2 shown in FIG. 5, the power supply to the power blocks 313, 314, and 315 is stopped. Although the power saving mode M2 is distinguished from the power saving mode M1 in that the scan function and the print function are stopped, the USB function, the FAX reception function, and the network transmission/reception function can operate. Although in this state, scan processing and print processing, such as copying, are not performed, this state is suitable for a case where requests from external interfaces, such as a network, a public communication line, and a USB device, need be received.

In the power saving mode M3 shown in FIG. 6, the power supply to the power blocks 313, 314, 315, and 316 is stopped. Although the power saving mode M3 is distinguished from the power saving mode M2 in that not only the scan function and the print function but also the USB function is stopped, the FAX reception function and the network transmission/reception function can operate. This state is suitable for a case where it is not required to use the USB interface 222, differently from the state in the power saving mode M2.

The power saving mode M4 (first specific power saving mode) and the power saving mode M5 (second specific power saving mode), both shown in FIG. 7, are different from each other in the amount of power supplied to target blocks, due to a difference between communication speeds set for a communication link, as described hereinafter. However, both of the power saving modes M4 and M5 are particularly high in power saving efficiency among the power saving modes, and hence these two modes are referred to as "the specific power saving modes". In the specific power saving modes, the power supply to the power blocks 313, 314, 315, 316, 317, and 310 is stopped. The specific power saving modes are distinguished from the power saving mode M3 in that not only the USB function but also the FAX reception function and the function as the main controller of the information processing device 210 are stopped. Further, since energization of the power block 310 is stopped, the operation of the expansion interface 215 is stopped, so that it is impossible to pass a packet received by the NIC 230 via the network 103 to the information processing device 210. Therefore, the network transmission/reception function is basically stopped.

However, in the specific power saving modes, the NIC 230 can operate a proxy response function and a Wake-on-LAN function. In the proxy response function and the Wake-on-LAN function, a program operating on the NIC 230 analyzes a data pattern of a packet received via the network 103, and checks whether or not the data pattern matches a specific data pattern stored in the RAM 234. The proxy response function is a function in which when the data pattern matches a specific data pattern associated therewith, the above-mentioned program generates response data according to the packet received by the NIC 230, and transmits the response data to a sender of the packet, on behalf of the information processing device 210 in a power saving state. On the other hand, differently from the proxy response function, the Wake-on-LAN function is a function in which when the data pattern matches a specific data pattern associated therewith, the CPU 231 transmits a return signal for returning the power mode to the normal power mode, to the power supply controller 224, whereby each specific power saving mode is shifted to the normal power mode. The Wake-on-LAN function is basically used in a case where a request of the packet received via the network 103 cannot be coped with by the NIC 230. Typical examples of the case include a case where a print job has been received. In this case, it is essentially required to cause the printer 260 to operate, and hence it is necessary to shift the power mode by making use of the Wake-on-LAN function. Even when it is impossible to communicate with the expansion interface 215 in the power saving modes, the NIC 230 can perform network transmission/reception processing by operating the proxy response function.

The specific power saving modes are distinguished from the other power saving modes M1 to M3 in that in the specific power saving modes, the image forming apparatus 101 is in a power state where no other functions than the requisite minimum network transmission/reception function are in operation. Communication 318 is performed between switching devices, such as HUBs, used for physically connecting the NIC 230 to the network 103 via the network interface 235. The specific power saving modes include a mode in which the NIC 230 changes the communication speed of the communication 318. As described above, out of the specific power saving modes, the power saving mode M5 is a mode which reduces the communication speed of a network communication link (hereinafter referred to as the "communication link speed") between the NIC 230 and a counter device (such as a HUB) as a communication partner.

In general, a counter device and a network interface connected thereto are capable of exchanging information on the communication link speeds which they support, when they are connected to each other. The program operating on the NIC 230 obtains supported link speeds which are communication link speeds supported by the counter device before the power mode is shifted to the specific power saving modes. When the power mode is shifted to one of the specific power saving modes, the program operating on the NIC 230 can connect the NIC 230 to the counter device at the lowest speed of the supported link speeds. For example, when communication between the NIC 230 and the counter device is being performed at 1 Gbps in the normal power mode, the NIC 230 can change the communication link speed such that the NIC 230 is connected to the counter device at 10 Mbps half-duplex.

To return the changed communication link speed to the speed before the change, it is required to temporarily disconnect the communication link and then re-establish the communication link at the speed before the change, and hence it sometimes takes time to establish the communication link with the counter device. However, the NIC 230 can avoid disconnection of the communication link by not changing but maintaining the communication link speed employed during normal operation of the image forming apparatus in the other of the specific power saving modes, to thereby prevent degradation of network processing performance of the image forming apparatus. Out of the specific power saving modes, the power saving mode M4 is a mode in which the communication link speed is not lowered.

FIG. 20A shows a list of the power states and the communication speeds in the respective power modes (Table 1). A power mode in which a larger number of power blocks have ceased to be energized is higher in power saving effects. Further, the power saving mode M5 has higher power saving effects than the power saving mode M4 since the power saving mode M5 is slower in communication speed than the power saving mode M4.

Figure 8:
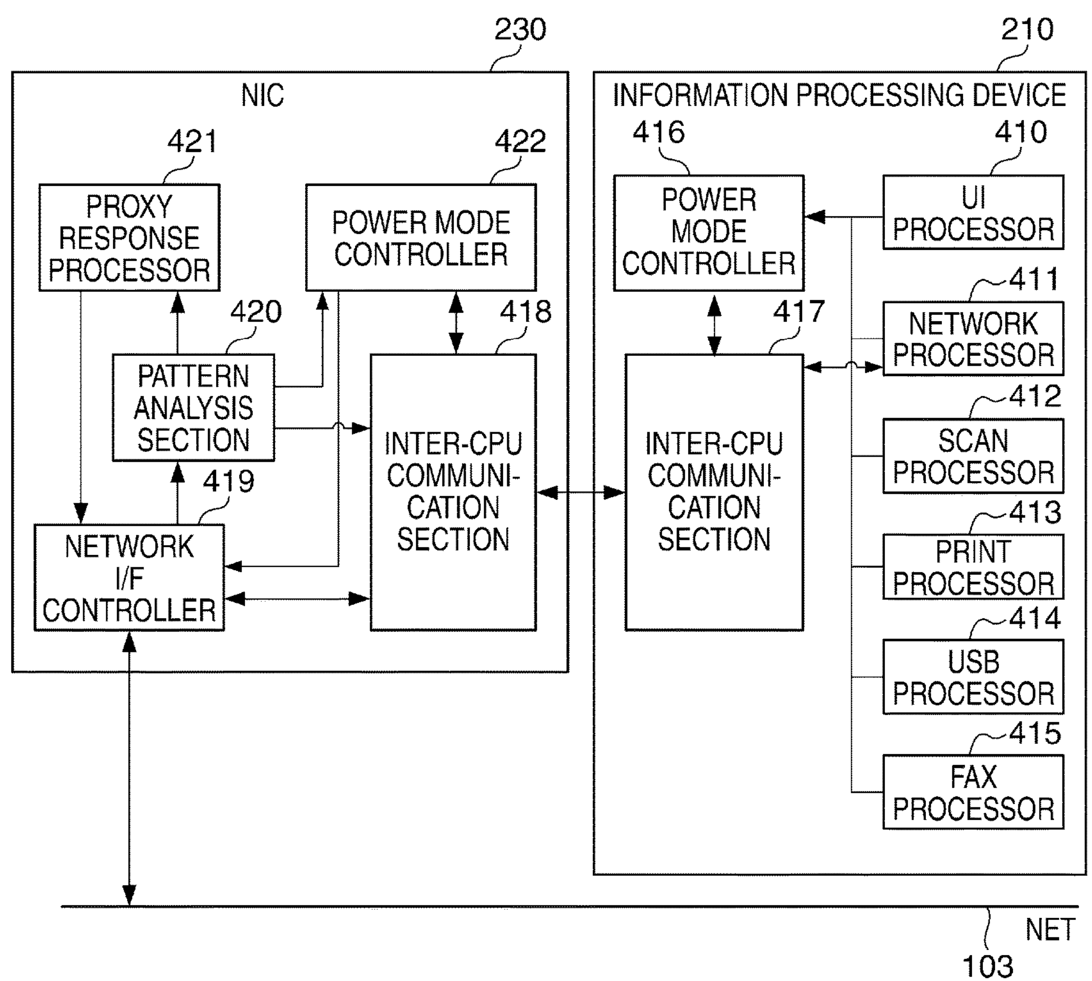
FIG. 8 is a block diagram of main software modules.

FIG. 8 is a block diagram of main software modules which operate on the information processing device 210 and the NIC 230. Software modules operating on the information processing device 210 are realized by cooperation of the components, including the CPU 211, of the information processing device 210, and software modules operating on the NIC 230 are realized by cooperation of the components, including the CPU 231, of the NIC 230.

In the information processing device 210, a UI processor 410 receives an instruction input by a user via the console section 240, and transmits contents of a user's request to the functional elements of the information processing device 210. The UI processor 410 causes a screen to be displayed on the console section 240, and is also capable of receiving an input from the screen. The UI processor 410 updates the screen, as required. In the NIC 230, a network packet is received by a network interface controller 419. A network processor 411 of the information processing device 210 receives the network packet received by the NIC 230 via the network interface controller 419 and inter-CPU communication sections 418 and 417, analyzes the network packet, and performs processing thereon according to network protocols. The network processor 411 generates a response packet responsive to a packet processed as described above, and a transmission packet to be voluntarily transmitted from the information processing device 210 based on network protocols. Packets thus generated are transmitted to the network 103 via the inter-CPU communication sections 417 and 418 and the network interface controller 419.

Further, in a case where the image forming apparatus 101 is shifted to the power saving mode M4 or the power saving mode M5, the network processor 411 is capable of determining to which mode the image forming apparatus 101 is to be shifted. In doing this, the network processor 411 cooperates with the network interface controller 419 to obtain the supported link speeds of the counter device and the current link speed of a currently connected communication link, and further obtain information on protocols in current use and an environment of connection to the external device. Then, the network processor 411 determines, based on the speeds and information thus obtained, to which of the power saving modes M4 and M5 the image forming apparatus 101 should be shifted.

In response to a scan request received from the user via the console section 240, a scan processor 412 performs control for capturing image data from the scanner 250, passes the captured image data to the scanner image processor 219, and gives instructions thereto for performing correction, manipulation, editing, and other processing on the image data. A print processor 413 passes image data to the printer image processor 221, and gives instructions for performing color conversion, filtering, resolution conversion, and forth, on the image data. Further, the print processor 413 obtains processed image data from the printer image processor 221, and instructs the printer 260 to print the image data. A USB processor 414 communicates with a USB device, such as a storage device mounted on the USB connector 270, and gives instructions to the functions of the information processing device 210, which are associated with respective requests from the USB device, and returns responses from the functions to the USB device. A FAX processor 415 controls the FAX 280 to thereby request the print processor 413 to print data received from the public communication line, and perform FAX transfer processing according to a FAX transfer request received via the console section 240 from the user.

A power mode controller 416 as a control unit for controlling the operating power modes controls the power supply controller 224 to thereby perform a power mode-shifting process for shifting between the normal power mode and the power saving modes. In performing the power mode-shifting process, the power mode controller 416 acquires, from each of the processors 410, 411, 412, 413, 414, and 415, "information on a shiftable operating power mode" (indicated in each column of Table 2, referred to hereinafter) indicating the most power-saving one of the power saving modes to which the image forming apparatus 101 can be shifted on condition that each associated processor is operable. Transmission and reception of a notification of this information may be performed by a method in which each of the processors 410, 411, 412, 413, 414, and 415 voluntarily notifies the power mode controller 416 of the information or a method in which the power mode controller 416 acquires the information by inquiring each of the processors 410, 411, 412, 413, 414, and 415 about the information. Through the control by the power mode controller 416 and the power supply controller 224, the image forming apparatus 101 can be shifted to a power saving mode determined based on the above-mentioned notified information. Further, the power mode controller 416 transmits to a power mode controller 422 via the inter-CPU communication sections 417 and 418 a notification of shifting to a power saving mode, which indicates the fact that the image forming apparatus 101 is to be shifted to a power saving mode and to which power saving mode it is to be shifted. The transmission of the notification can cause the NIC 230 to detect the stop of energization of the expansion interface 215, and operate in a mode performing proxy response processing or Wake-on-LAN processing on a packet received via the network 103. The inter-CPU communication section 417 communicates with the inter-CPU communication section 418 and interrupts the CPUs 211 and 231 by using the expansion interface 215. This makes it possible to exchange network packets between the NIC 230 and the information processing device 210 and transmit notifications of various power modes.

In the NIC 230, the inter-CPU communication section 418 communicates with the inter-CPU communication section 417 and interrupts the CPUs 211 and 231 by using the expansion interface 232. This makes it possible to exchange network packets between the NIC 230 and the information processing device 210 and transmit notifications of various power modes. The network interface controller 419 controls the network interface 235 to control data communication with external apparatuses (the PC 102, etc.) on the network 103 via the NIC 230. The network interface controller 419 receives a packet via the network 103, and passes the packet to a pattern analysis section 420 in the power saving modes M4 and M5. In the power modes other than the power saving modes M4 and M5, the network interface controller 419 passes the packet to the network processor 411 via the inter-CPU communication sections 418 and 417. Further, the network interface controller 419 performs control for transmitting packets generated by the network processor 411 and a proxy response processor 421 to the network 103. Furthermore, the network interface controller 419 obtains the supported link speeds of a counter device of an external apparatus, which is connected as a communication partner to the NIC 230. The network interface controller 419 selects a link speed from link speeds supported by the NIC 230, at which the information processing device 210 can link up with the external apparatus, and instructs the network interface 235 to establish a network communication link at the selected link speed.

The pattern analysis section 420 receives a packet received via the network 103 during the power saving mode M4 or the power saving mode M5, from the network interface controller 419. Then, the pattern analysis section 420 performs pattern analysis in order to determine whether the proxy response processing or the Wake-on-LAN processing is to be performed or the packet is to be discarded. If the packet requires the proxy response processing, the pattern analysis section 420 instructs the proxy response processor 421 to generate a proxy response packet. When the proxy response processor 421 receives the instruction to generate a proxy response packet associated with the packet received via the network 103, from the pattern analysis section 420, the proxy response processor 421 generates the proxy response packet, and instructs the network interface controller 419 to transmit the generated proxy response packet. If the packet requires the Wake-on-LAN processing, the pattern analysis section 420 instructs the power mode controller 422 to perform the Wake-on-LAN processing. Then, the pattern analysis section 420 sends the packet, which was an object subjected to the pattern analysis, to the network processor 411 via the inter-CPU communication sections 418 and 417.

The power mode controller 422 manages power modes of the NIC 230. The power modes of the NIC 230 are broadly categorized into specific power saving modes (M4 and M5), and other power modes (normally, M1 to M3) than the specific power saving modes. At a stage preceding the shift of the image forming apparatus 101 to one of the specific power saving modes, the power mode controller 422 receives information on which of the specific power saving modes M4 and M5 the image forming apparatus 101 is to be shifted and a network link speed after the shift, from the network processor 411. At the time of shifting to one of the specific power saving modes, the power mode controller 422 receives from the power mode controller 416 a power mode shift notification notifying that the image forming apparatus 101 is to be shifted to the one of the power saving modes. To change the power mode of the NIC 230 according to this notification, the power mode controller 422 notifies the network interface controller 419 of the one of the specific power saving modes to which the image forming apparatus 101 is to be shifted and the network link speed after the shift. Upon receipt of the power mode shift notification, the network interface controller 419 checks the received network link speed of a communication link to be connected, and determines whether or not it is required to re-link, i.e. re-establish the communication link. Further, the network interface controller 419 changes a passing destination of a packet received via the network 103, from the network processor 411 used as the passing destination until then, to the pattern analysis section 420. This makes it possible to perform the proxy response processing by the NIC 230 alone in the specific power saving mode M4 or the specific power saving mode M5.

The image forming apparatus 101 is shifted (returned) from the specific power saving mode (M4 or M5) to one of the other power modes in response to the instruction of the Wake-on-LAN processing, which the power mode controller 422 receives from the pattern analysis section 420. In doing this, the power mode controller 422 generates an interrupt to the power supply controller 224 via the CPU 231. In response to this interrupt, the power supply controller 224 starts at least energization of the power block 310. By the energization of the power block 310, the expansion interface 215 and the inter-CPU communication section 417 controlling the expansion interface 215 is made operable. After that, the power mode controller 422 notifies the network interface controller 419 of the shift to the other power mode. Upon receipt of the notification from the power mode controller 422, the network interface controller 419 changes the passing destination of a packet received via the network 103, from the pattern analysis section 420 used as the passing destination until then, to the network processor 411. This makes it possible to return the proxy response processing performed by the NIC 230 alone to communication processing which is performed by the NIC 230 in cooperation with the information processing device 210.

FIG. 20B shows an example of "information on a shiftable operating power mode" (Table 2) which the power mode controller 416 receives from each of the processors 410 to 415. This information indicates the most power-saving one of the power saving modes to which the image forming apparatus 101 can be shifted on condition that each associated processor is operable. In other words, this information indicates a power mode highest in power saving efficiency of the power modes to which the image forming apparatus 101 can be shifted while maintaining an operation of each associated processor which is required depending on the situation. The power mode controller 416 checks information collected as shown in Table 2 to thereby perform the power mode-shifting process.

According to an example in Table 2, the power mode controller 416 is notified, from the UI processor 410, of the normal power mode as the above-mentioned information on a shiftable operating power mode. This means that the power mode controller 416 has received a notification to the effect that the image forming apparatus 101 cannot be shifted from the normal power mode to the power saving mode in a case where the UI processor 410 is kept operable. This is, for example, a case where the console section 240 is being operated by the user. From the UI processor 410, the power saving mode M5 is sometimes notified in the information on a shiftable operating power mode, as an example other than the example indicated in Table 2. It is possible to envisage, as this example, a case where when there has been no user input to the console section 240 for a predetermined time period, the UI processor 410 notifies the power mode controller 416 of the power saving mode M5, thereby enhancing the power saving effects.

According to an example in Table 2, from the scan processor 412, the power mode controller 416 is notified of the power saving mode M5 as the above-mentioned information. The power saving mode M5 is the highest in power saving efficiency, and hence when the scan function alone is considered, it is possible to shift the image forming apparatus 101 to any power mode. This example (the power saving mode M5) corresponds to a case where the scan function is not in operation. When the scan processing is being performed, the scan processor 412 notifies the normal power mode as an example other than the example indicated in Table 2. In this case, the image forming apparatus 101 is not shifted to any of the power saving modes.

According to an example in Table 2, from the print processor 413, the power mode controller 416 is notified of the power saving mode M5 as the above-mentioned information. In this case, similar to the example of the scan function, the image forming apparatus 101 can be shifted to any power mode. This example (the power saving mode M5) corresponds to a case where the print function is not in operation. When the print processing is being performed, the print processor 413 notifies the normal power mode as an example other than the example indicated in Table 2. In this case, the image forming apparatus 101 is not shifted to any of the power saving modes.

According to an example in Table 2, from the USB processor 414, the power mode controller 416 is notified of the power saving mode M2 as the above-mentioned information. The power saving mode M2 is lowest in power saving efficiency next to the power saving mode M1. Therefore, when the USB function alone is considered, it is possible to shift the image forming apparatus 101 to one of the normal power mode, the power saving mode M1, and the power saving mode M2. This example (the power saving mode M2) corresponds to a case where the USB device connected to the USB connector 270 is performing communication, such as data I/O processing. When the USB device is unconnected or unused, the USB processor 414 notifies the power saving mode M5 as an example other than the example indicated in Table 2. In this case, the image forming apparatus 101 can be shifted to the power saving mode M5, which enhances the power saving efficiency.

According to an example in Table 2, from the FAX processor 415, the power mode controller 416 is notified of the power saving mode M3 as the above-mentioned information. Therefore, when the facsimile function alone is considered, it is possible to shift the image forming apparatus 101 to one of the normal power mode, and the power saving modes M1, M2, and M3. This example (the power saving mode M3) corresponds to a case where the FAX 280 can be used and is on standby for FAX reception from the public communication line. When the FAX reception occurs and the FAX processor 415 instructs the print processor 413 to print the received FAX, the FAX processor 415 notifies the power mode controller 416 of the power saving mode M1 or the normal power mode, as an example other than the example indicated in Table 2.

According to an example in Table 2, from the network processor 411, the power mode controller 416 is notified of the power saving mode M3 as the above-mentioned information. Therefore, when the network function alone is considered, it is possible to shift the image forming apparatus 101 to one of the normal power mode, and the power saving modes M1, M2, and M3. The network processor 411 notifies the power mode controller 416 of the power saving mode M3 in a case where a Multicast DNS function (mDNS, RFC6762, RFC6763) is used as a general network protocol, by way of example. The mDNS (Multicast Domain Name System) is used when a terminal or the like on the network transmits a packet in order to search for a terminal having a specific name. As general specifications of the mDNS function, a terminal at a receiving end which is required to send a response to the mDNS packet transmitted from the terminal at a transmitting end is required to send the response within two or three seconds after the packet is transmitted from the terminal at the transmitting end. The example in Table 2 (the power saving mode M3) corresponds to a case where it is only required to thus analyze a packet and respond to the packet at a high speed, thereby performing packet transmission and reception by the network processor 411 alone without depending on the other functions of the image forming apparatus 101.

Note that when the network processor 411 does not use the mDNS function, there can be envisaged e.g. a case where the network processor 411 notifies the power mode controller 416 of the power saving mode M4 or the power saving mode M5 as the above-mentioned information, to thereby enhance the power saving effects. Further, as an operation different from the operations of the other processors, the network processor 411 can control the NIC 230 to one of the power saving modes M4 and M5 while notifying the power mode controller 416 of the power saving mode M4 or the power saving mode M5.

The network processor 411 instructs the network interface controller 419 to obtain the supported link speeds of a counter device, via the inter-CPU communication sections 417 and 418, at a stage preceding a shift to one of the power saving modes. Together with this, the network processor 411 obtains a current link speed as the communication speed of a currently connected link, from the network interface controller 419. The network processor 411 selects the lowest link speed of the obtained supported link speeds in order to realize the power saving mode M5, and selects the same speed as the current link speed in order to realize the power saving mode M4. The network processor 411 notifies the power mode controller 422 of the selected link speed via the inter-CPU communication sections 417 and 418. Before the image forming apparatus 101 is shifted to the power saving mode M4 or M5, the power mode controller 422 notifies the network interface controller 419 of the shift to the power saving mode and the link speed notified from the network processor 411. The network interface controller 419 maintains the communication speed of the currently connected link if the notified link speed the same as the communication speed, whereas if the notified link speed is different from the communication speed, the network interface controller 419 temporarily disconnects the communication link, and then establishes the communication link again at the notified link speed.

When the image forming apparatus 101 is shifted to one of the specific power saving modes, the network processor 411 determines to which of the power saving modes M4 and M5 the apparatus should be shifted. First, the network processor 411 selects and determines the specific power saving mode M4 or M5 with reference to whether or not an image controller (also referred to as a "print controller") is connected to the image forming apparatus 101 via the network 103. In general, the image controller is connected for the purpose of causing a multifunction peripheral to perform printing more conveniently, with a higher image quality, at a higher speed. Therefore, in a case where the image controller and the image forming apparatus 101 cooperate with each other, it is important to take it into account not to waste time in setting the communication speed of the image forming apparatus 101. Assuming that the image forming apparatus 101 is shifted to the specific power saving mode M5, re-linking i.e. re-establishment of the communication link occurs when the image forming apparatus 101 is returned to the normal power mode, which wastes time. To avoid this, the network processor 411 checks whether or not there is an image controller cooperating with the image forming apparatus 101. This check is performed e.g. by checking a setting of cooperation with an image controller, which is stored in the image forming apparatus 101, or transmitting and receiving a packet for checking the existence of a image controller to and from a network address fixedly assigned to each image controller. If there is a cooperating image controller, the network processor 411 selects the power saving mode M4.

Alternatively, the power saving mode M4 or M5 is selected and determined with reference to whether or not a SIP (Session Initiation Protocol) is operating in an NGN (Next Generation Network) environment. A packet received during SIP communication in the NGN standard requires a response to be sent within five seconds. Assuming that the image forming apparatus 101 is shifted to the power saving mode M5, re-linking i.e. re-establishment of the communication link occurs when the image forming apparatus 101 is returned to the normal power mode, which makes it difficult to guarantee a response within five seconds. To solve this problem, the network processor 411 checks a setting held by the image forming apparatus 101 as to whether or not to operate the SIP in the NGN environment. If the operation of the SIP in the NGN environment has been set, the power saving mode M4 is selected, and otherwise, the power saving mode M5 is selected.

Figure 9:
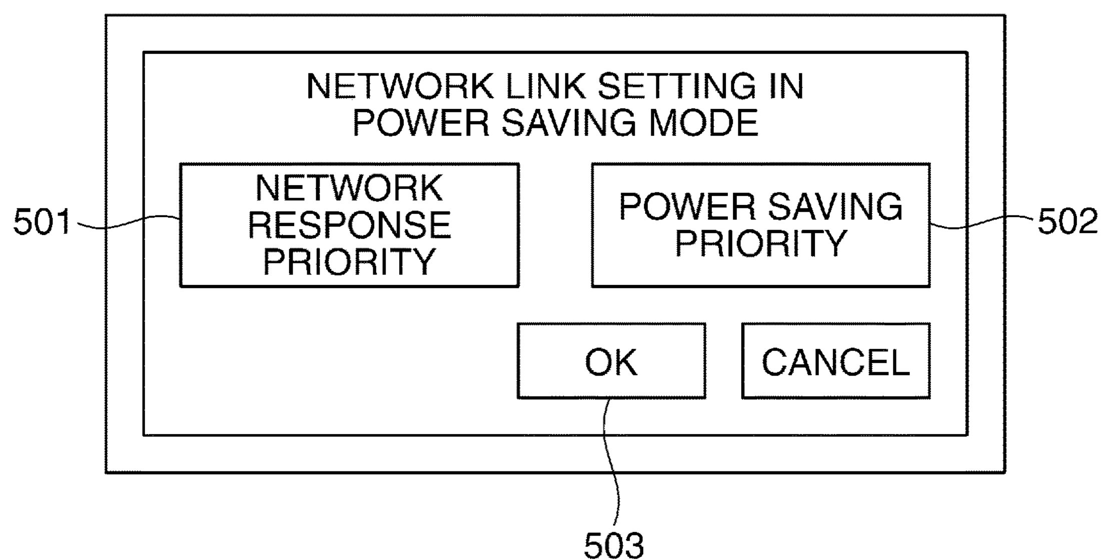
FIG. 9 is a view of a priority setting screen.

FIG. 9 is a view of a priority setting screen which enables the user to set the specific power saving mode (M4 or M5) on the console section 240. The priority setting screen is displayed on the console section 240 under the control of the UI processor 410. On the priority setting screen, a network response priority button 501 and a power saving priority button 502 are displayed in a selectable manner. The network response priority button 501 is a button for inputting a selection option (first priority option) which gives priority to the communication speed, and the power saving priority button 502 is a button for inputting a selection option (second priority option) which gives priority to power saving. The user can select a desired priority option. More specifically, the buttons 501 and 502 are buttons for selecting the power saving mode M4 and the power saving mode M5, respectively. The buttons 501 and 502 are toggle buttons and it is impossible to select them at the same time.

When the user selects the network response priority button 501 and presses an OK button 503, the UI processor 410 stores information that a network response priority (the power saving mode M4) has been selected, in a setting data storage area of the NVRAM 213. When the user selects the power saving priority button 502 and presses the OK button 503, the UI processor 410 stores information that a power saving priority (the power saving mode M5) has been selected, in the setting data storage area of the NVRAM 213. With this, when the image forming apparatus 101 is shifted to a specific power saving mode (M4 or M5), a user's will can be reflected on the shift. Thus, the UI processor 410 and the console section 240 play a role of "a setting unit" in cooperation with each other.

Figure 10:
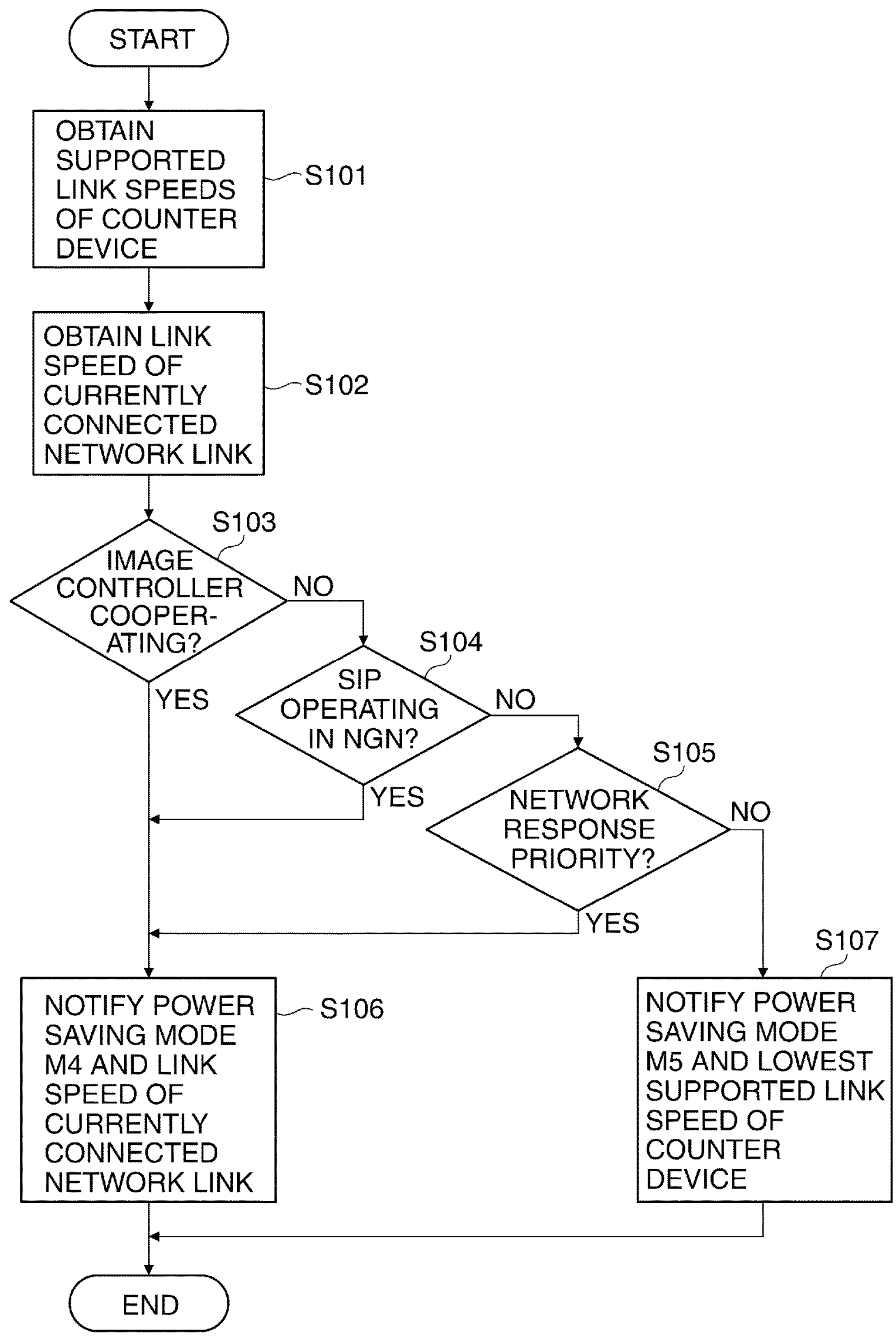
FIG. 10 is a flowchart of a process for selecting and determining a specific power saving mode.

FIG. 10 is a flowchart of a process for selecting and determining a specific power saving mode (M4 or M5), which is performed by the network processor 411. This process is performed after the start of the image forming apparatus 101, before being shifted to one of the specific power saving modes.

In a step S101, the network processor 411 obtains the supported link speeds of a counter device from the network interface controller 419 via the inter-CPU communication sections 417 and 418. In a step S102, the network processor 411 obtains a current link speed of a currently connected link from the network interface controller 419. In a step S103, the network processor 411 determines whether or not there is an image controller connected to and cooperating with the image forming apparatus 101, by the above-described checking method. If it is determined that there is a cooperating image controller, the network processor 411 proceeds to a step S106. In the step S106, the network processor 411 determines the power saving mode M4 as an operating power mode, and notifies the power mode controller 422 of the determination of the power saving mode M4 and the link speed obtained in the step S102 via the inter-CPU communication sections 417 and 418. After that, the process in FIG. 10 is terminated.

On the other hand, if it is determined that there is not a cooperating image controller, the network processor 411 determines in a step S104 whether or not the operation of the SIP in the NGN environment has been set. This determination is performed e.g. by obtaining the setting as to whether or not to operate the SIP in the NGN environment, from settings of the image forming apparatus 101, which are stored in the NVRAM 213. If it is determined that the operation of the SIP in the NGN environment has been set, the network processor 411 proceeds to the step S106. Therefore, the power saving mode M4 is determined as the operating power mode.

On the other hand, if it is determined that the operation of the SIP in the NGN environment has not been set, the network processor 411 determines in a step S105 whether or not information on the selection of the priority option (selected from the priority setting screen shown in FIG. 9) stored in the NVRAM 213 is the information of selection of the network response priority. If it is determined that the information of the network response priority is stored, the network processor 411 proceeds to the step S106. Therefore, the power saving mode M4 is determined as the operating power mode. On the other hand, if it is determined that the information of selection of the network response priority is not stored, i.e. if the information of selection of the power saving priority is stored, the network processor 411 proceeds to a step S107. In the step S107, the network processor 411 determines the power saving mode M5 as the operating power mode. Further, the network processor 411 notifies the power mode controller 422 of the determination of the power saving mode M5, and a link speed lowest of the link speeds obtained in the step S101, via the inter-CPU communication sections 417 and 418.

As described above, in the steps S106 and S107, the network processor 411 plays a role of a "control unit". After the above notification, the process in FIG. 10 is terminated.

Figure 11:
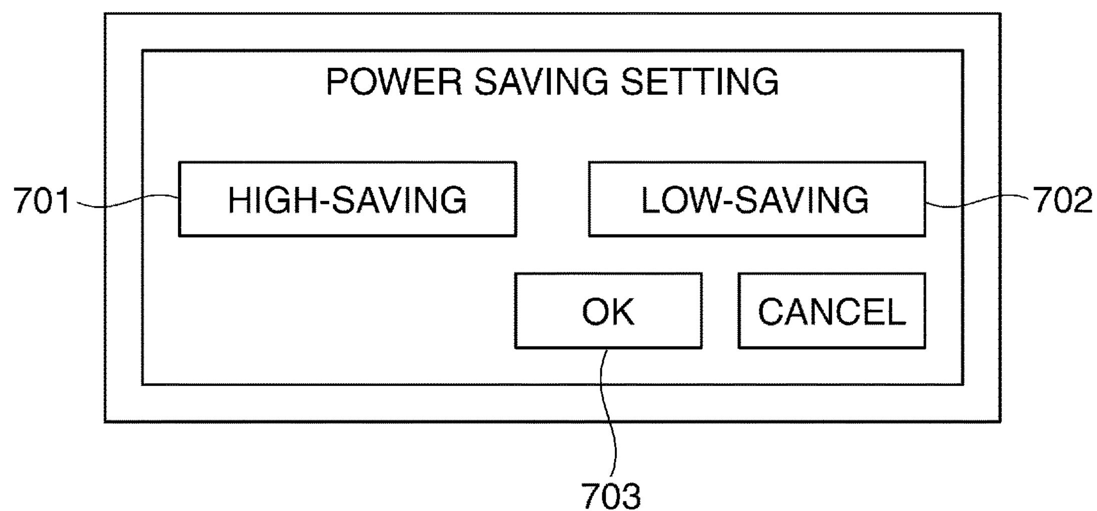
FIG. 11 is a view of a power saving setting screen.

FIG. 11 is a view of a power saving setting screen which enables the user to set a power saving mode from the console section 240. The power saving setting screen is displayed on the console section 240 under the control of the UI processor 410. This power saving setting screen is displayed before displaying the priority setting screen (FIG. 9), for example.

A "high-saving" button 701 and a "low-saving" button 702 are displayed in a selectable manner on the power saving setting screen (FIG. 11). The high-saving button 701 is a button for selecting a mode higher in power-saving efficiency, i.e. smaller in power consumption than the low-saving button 702. More specifically, the high-saving button 701 is used for selectively enabling the image forming apparatus 101 to be shifted up to the specific power saving mode (the power saving mode M4 or M5) in which the NIC 230 alone operates. The low-saving button 702 is used for selectively enabling the image forming apparatus 101 to be shifted up to the power saving mode M3. The buttons 701 and 702 are toggle buttons and it is impossible to select them at the same time.

When the high-saving button 701 is selected and an OK button 703 is pressed, the UI processor 410 stores information of the selection of the specific power saving mode, as a power saving setting in the setting data storage area of the NVRAM 213. When the low-saving button 702 is selected and the OK button 703 is pressed, the UI processor 410 stores information of the selection of the power saving mode M3, as the power saving setting in the setting data storage area of the NVRAM 213.

Incidentally, on the priority setting screen (FIG. 9), the user can select an item from the viewpoint of which of the communication speed and the power saving should be given priority when in a specific power saving mode. On the other hand, the power saving setting screen (FIG. 11) is configured to enable the user to select to which power saving mode the image forming apparatus 101 can be shifted in order to save power consumption. In the example illustrated in FIG. 11, to eliminate complicated selection operations, two options are provided, and the power saving mode M3 and the power saving mode M4 is used to define a substantial boundary (threshold) between the two options. However, the power saving setting screen is only required to be configured such that it can receive a mode desired by the user as a power saving mode to which the image forming apparatus 101 can be shifted, and is not limited to the screen configuration illustrated in FIG. 11. For example, three or more selection buttons may be provided. Further, buttons may be provided for the respective power saving modes (M1 to M5) such that the power saving modes can be individually selected. Alternatively, the number of selectable buttons may remain two as in the illustrated example, but the buttons may be assigned to respective power saving modes other than those described above (e.g. the high-saving button 701 is assigned to the power saving mode M3 and the specific power saving modes). In short, the power saving modes assigned to the respective buttons are not limited to the illustrated example.

Figure 12:
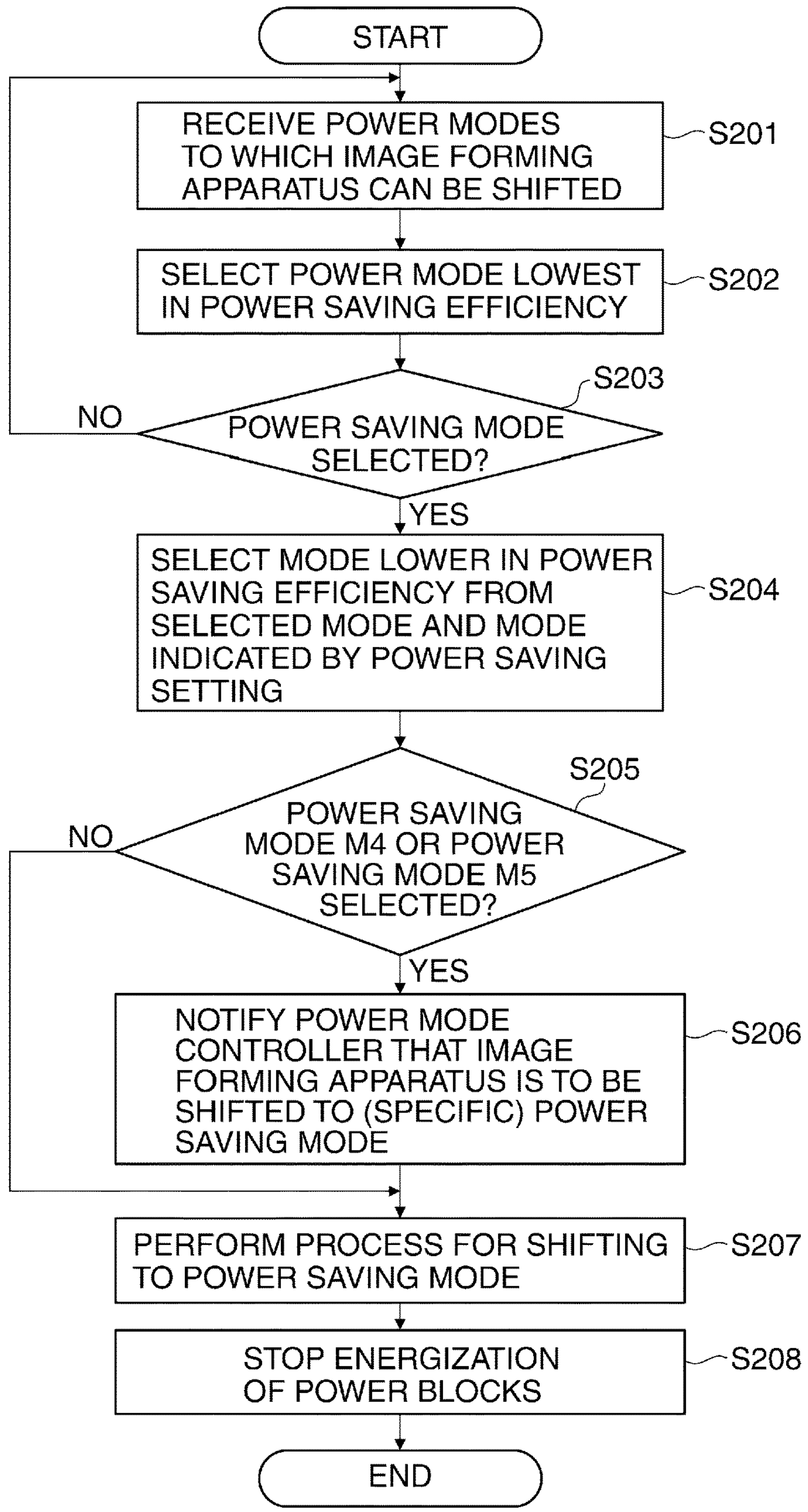
FIG. 12 is a flowchart of a power mode control process.

FIG. 12 is a flowchart of a power mode control process performed by the power mode controller 416 when the image forming apparatus 101 is shifted to the power saving modes. First, in a step S201, the power mode controller 416 receives the information on shiftable operating power modes (Table 2) from the processors 410 to 415. In a step S202, the power mode controller 416 refers to the information received in the step S201, and selects a power mode lowest in power-saving efficiency from the power modes to which the image forming apparatus 101 can be shifted. This is because it is required to select a power mode lowest in power saving efficiency (having the lowest degree of power saving) so as to enable all the functions of the image forming apparatus 101 to be normally shifted to the selected power saving mode.

In a step S203, the power mode controller 416 determines whether or not the power mode selected in the step S202 is one of the power saving modes (one of M1 to M5). If the selected power mode is none of the power saving modes but the normal power mode, the process returns to the step S201. On the other hand, if the selected power mode is one of the power saving modes, in a step S204, the power mode controller 416 obtains the power saving setting (setting set in FIG. 11) stored in the NVRAM 213. Further, the power mode controller 416 selects a mode lower in power saving efficiency from a power saving mode indicated by the obtained power saving setting and the power saving mode selected in the step S202.

As a consequence, out of the power saving modes indicated by the information on shiftable operating power modes and the power saving modes indicated by the power saving setting made by the user, the power saving mode lowest in power saving efficiency is selected as a power saving mode to which the apparatus is to be shifted.

Next, in a step S205, the power mode controller 416 determines whether or not the power saving mode selected in the step S204 is one of the specific power saving modes (the power saving mode M4 or M5). If it is determined that the selected power saving mode is one of the specific power saving modes, in a step S206, the power mode controller 416 transmits a notification to the effect that the image forming apparatus 101 is to be shifted to one of the specific power saving modes, to the power mode controller 422 via the inter-CPU communication sections 417 and 418. Then, the process proceeds to a step S207. On the other hand, if it is determined that the selected power saving mode is none of the specific power saving modes, the power mode controller 416 proceeds to the step S207 without transmitting the notification in the step S206.

In the step S207, the power mode controller 416 performs a process for shifting to a power saving mode. This process includes saving necessary information, notification of the shift to relevant modules, and preparations made in advance for returning the image forming apparatus 101 from the power saving mode. In a step S208, the power mode controller 416 stops energization of power blocks which do not require energization, according to the power saving mode selected in the step S204. Then, the process in FIG. 12 is terminated.

Figure 13:
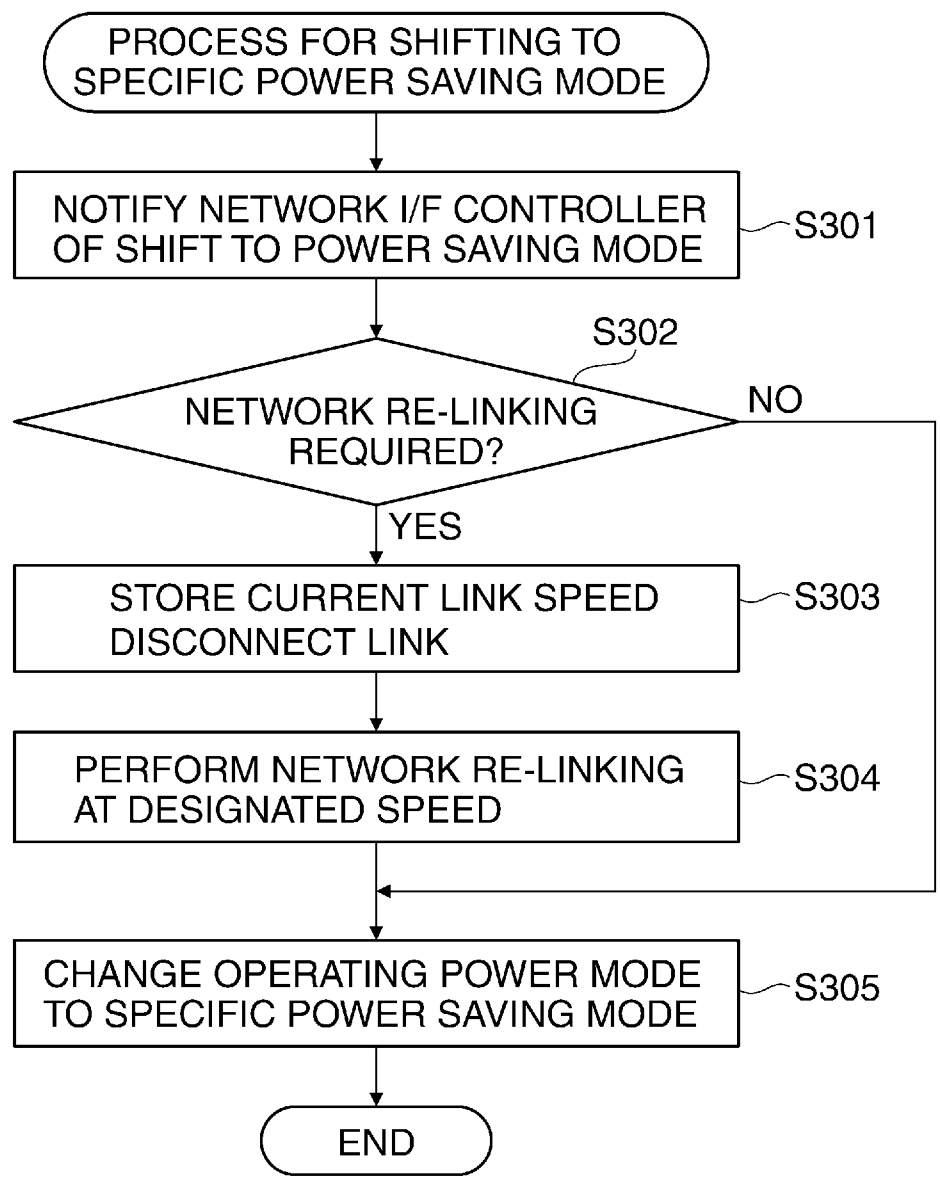
FIG. 13 is a flowchart of a process for shifting to a specific power saving mode.

FIG. 13 is a flowchart of a process for shifting to a specific power saving mode, which is performed by the NIC 230. This process is started when the power mode controller 422 has received from the power mode controller 416, in the step S206 in FIG. 12, the notification to the effect that the image forming apparatus 101 is to be shifted to one of the specific power saving modes.

In a step S301, the power mode controller 422 transmits to the network interface controller 419 a notification to the effect that the image forming apparatus 101 is to be shifted to a power saving mode. Here, the power mode controller 422 notifies the network interface controller 419 of the determination of the power saving mode M4 and the link speed notified in the step S106 in FIG. 10 or the determination of the power saving mode M5 and the supported link speed (the lowest supported link speed) notified in the step S107 in FIG. 10.

In a step S302, the network interface controller 419 compares the link speed notified in the step S301 and the current link speed of the currently connected link. Then, the network interface controller 419 determines whether or not the two link speeds are different from each other, to thereby determine whether or not it is required to perform re-linking i.e. re-establish the communication link. If the two link speeds are different from each other, it is required to re-link i.e. re-establish the communication link, and hence in a step S303, the network interface controller 419 stores the current link speed for a re-linking process to be performed when the operating power mode is returned from the changed one, and disconnects the network interface 235 from the communication link. Next, in a step S304, the network interface controller 419 reconnects the network interface 235 to the communication link at the notified link speed, and then proceeds to a step S305.

On the other hand, if it is determined in the step S302 that the notified link speed and the current link speed are the same, it is not required to re-link i.e. re-establish the communication link, so that the network interface controller 419 proceeds to the step S305 while maintaining the current connection to the communication link. In the step S305, the network interface 235 changes the operating power mode to the specific power saving mode. This switches the passing destination of each packet received via the network 103, from the network processor 411 to the pattern analysis section 420. Therefore, it is possible to perform the proxy response processing by the NIC 230 alone in the specific power saving mode M4 or the specific power saving mode M5.

By performing the processes in FIGS. 10, 12, and 13, it is possible to shift the image forming apparatus 101 to the power saving modes according to the requirements of the functions and a user's will. Table 3 in FIG. 20C shows an example of a relationship between power mode-returning factors and respective return destination power modes to which the image forming apparatus 101 is to return from the specific power saving modes.

As illustrated in Table 3, the power mode controller 416 manages power modes to which the image forming apparatus 101 is to be shifted when returning from one of the specific power saving modes, on a return factor element-by-return factor element basis. The power mode controller 416 sets in advance, in the power supply controller 224, the return factors, and the power modes as destinations to which the image forming apparatus 101 is to be returned from the specific power saving modes, at a stage preceding a shift to each specific power saving mode.

According to examples in Table 3, in a case where the user operates the console section 240 to instruct the power mode controller 416 to cause the image forming apparatus 101 to return from the specific power saving modes, it is expected that copy processing and scan processing are performed, and hence the power mode controller 416 performs processing for returning the image forming apparatus 101 to the normal power mode. Further, in a case where the returning of the image processing apparatus 101 from the specific power saving modes is instructed according to reception of FAX, it is expected that print processing is performed although the console section 240 is not used, and hence the power mode controller 416 performs processing for returning the image forming apparatus 101 to the power saving mode M1. Further, in a case where the returning of the image processing apparatus 101 from the specific power saving modes is instructed by USB communication or reception of a packet by the Wake-on-LAN function, it is not clear whether or not print processing is to be performed, so that the power mode controller 416 performs processing for returning the image forming apparatus 101 to the power saving mode M2.

Here, the reason for returning the image processing apparatus 101 not to the power saving mode M1 but to the power saving mode M2 is as follows: First, in the image forming apparatus 101, the power blocks 314 and 315 consume the largest amount of electric power. When the image processing apparatus 101 returns from the specific power saving modes, there is a possibility that processing for returning the image forming apparatus 101 can be performed without restoring the power blocks 314 and 315 but by using only the power blocks other than 314 and 315. Therefore, the power mode controller 416 causes the image forming apparatus 101 to return to the power saving mode M2 for the time being, and then stepwise causes the apparatus to return to power modes lower in power saving efficiency, on an as-needed basis, when a notification of return of the apparatus to a power saving mode is further received from the scan processor 412 or the print processor 413.

Figure 14:
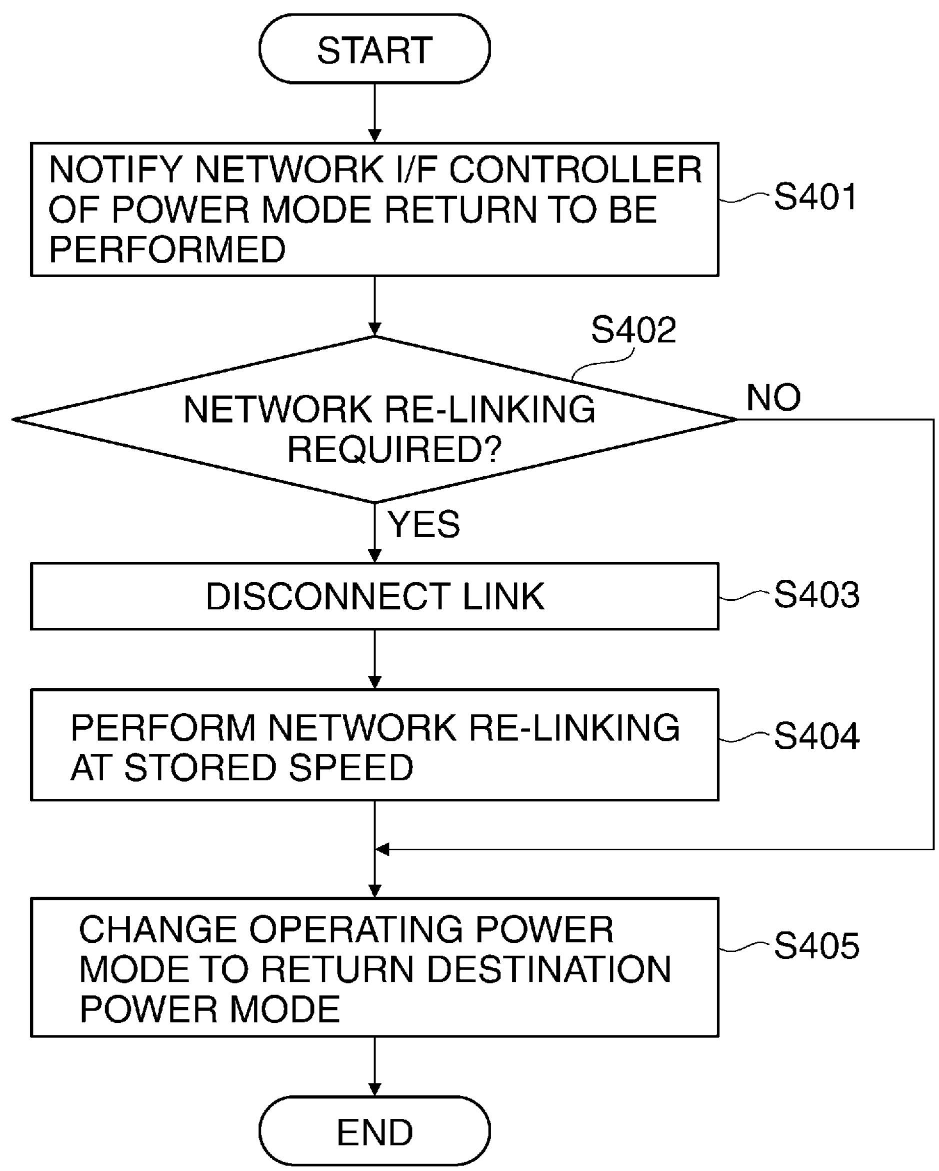
FIG. 14 is a flowchart of a return process.

FIG. 14 is a flowchart of a return process performed by the NIC 230, when the image forming apparatus 101 is returned from one of the specific power saving modes to a power mode other than the specific power saving modes by the Wake-on-LAN function. This process is started when the power mode controller 422 has received a Wake-on-LAN notification from the pattern analysis section 420 of the NIC 230.

In a step S401, the power mode controller 422 notifies the network interface controller 419 that a power mode return is to be performed. Further, along with this, the power mode controller 422 generates an interrupt to the power supply controller 224 via the CPU 231. The power supply controller 224 starts to energize associated power blocks using the interrupt as a trigger, according to the information on the power mode return factors and return destination power modes (Table 3) set in advance by the power mode controller 416.

According to an example illustrated in Table 3, the return factor of the reception of the Wake-on-LAN notification is "network", and the return destination power mode associated therewith is the power saving mode M2. Accordingly, the power supply controller 224 energizes the power blocks 310, 311, 312, 316, and 317 (see FIG. 5 and Table 1). This makes the expansion interface 215 and the inter-CPU communication section 417 operable.

In a step S402, the network interface controller 419 compares the current link speed of a currently connected link and the link speed having been stored for the re-linking process in the step S303. Then, the network interface controller 419 determines whether or not the two link speeds are different from each other, to thereby determine whether or not it is required to perform re-linking. If the two link speeds are different from each other, it is required to perform re-linking, and hence in a step S403, the network interface controller 419 disconnects the network interface 235 from the communication link. Next, in a step S404, the network interface controller 419 reconnects the network interface 235 to the communication link, i.e. re-establishes the communication link, at the above-mentioned stored link speed, and then proceeds to a step S405.

On the other hand, if the current link speed and the above-mentioned stored link speed are the same, it is not required to re-link i.e. re-establish the communication link, so that the network interface controller 419 proceeds to the step S405 while maintaining the current connection to the communication link. In the step S405, the network interface 235 changes the operating power mode from the specific power saving mode to the return destination power mode. With this, the passing destination of each packet received via the network 103 is changed from the pattern analysis section 420 to the network processor 411 via the inter-CPU communication sections 418 and 417. As a consequence, the network packet sent for Wake-on-LAN and packets subsequent thereto are analyzed and subjected to response processing by the network processor 411.

Note that in the case where the return destination power mode is the power saving mode M2, when a received packet can be subjected to the response processing by the NIC 230 alone, the network processor 411 performs the response processing while maintain the power saving mode M2. On the other hand, when the received packet cannot be subjected to the response processing by the NIC 230 alone, e.g. when the packet is a print job packet, the network processor 411 passes job data to the print processor 413. Together with the passing of the job data, the network processor 411 or the print processor 413 requests the power mode controller 416 to cause the image forming apparatus 101 to return to the power saving mode M1. This makes it possible to start the printer 260 and thereby perform printing.

As described above, in the case of the power saving mode M4 of the specific power saving modes, the steps S303 and S304 in FIG. 13 and the steps S403 and S404 in FIG. 14 are not executed. This realizes processing according to the network response priority (FIG. 9). On the other hand, in the case of the power saving mode M5 of the specific power saving modes, the steps S303 and S304 in FIG. 13 and the steps S403 and S404 in FIG. 14 are executed, whereby processing according to the power saving priority (FIG. 9) is realized.

According to the present embodiment, on the priority setting screen (FIG. 9), one of the selection option giving priority to the communication speed (the first priority option) and the selection option giving priority to power saving (the second priority option) is received from the user. In a case where the first priority option is received, the power saving mode M4 of the specific power saving modes is determined as the operating power mode, and in a case where the second priority option is received, the power saving mode M5 of the specific power saving modes is determined as the operating power mode. Then, the determined specific power saving mode and a communication speed dependent thereon are notified to the NIC 230 (steps S106 and S107). This makes it possible to reflect the user's will concerning which of the communication speed and the power saving efficiency should be given priority, one the determination of a power saving mode.

Further, when the power saving mode M4 is determined, the link speed of a currently connected link is notified as the communication speed, whereas when the power saving mode M5 is determined, the lowest supported link speed of the supported link speeds is notified as the communication speed. This makes it possible to particularly improve the power saving efficiency in the power saving mode M5.

Further, even in the case where the selection option giving priority to power saving (the second priority option) is received, if the operation of the SIP in the NGN environment is set, not the power saving mode M5 but the power saving mode M4 is determined as the operating power mode. Also, even in the case where the second priority option is received, if an image controller is connected as an external apparatus, not the power saving mode M5 but the power saving mode M4 is determined as the operating power mode. With these, it is possible to obtain an advantageous effect that no time is wasted by occurrence of re-linking (reconnection).

Further, it is determined whether or not the image forming apparatus 101 should be shifted to one of the specific power saving modes, based on the "information on shiftable operating power modes" (Table 2) received from the processors 410 to 415, and the power saving setting made by the user (FIG. 11). This makes it possible to determine whether or not to shift the image forming apparatus 101 to one of the specific power saving modes, by taking into account both of the states of the function sections and a user's will. Furthermore, the power saving mode lowest in power saving efficiency is selected from the power saving modes indicated by the information on shiftable operating power modes and the power saving modes indicated by the power saving setting made by the user, as a power saving mode to which the apparatus is to be shifted. Then, when the selected power saving mode is one of the specific power saving mode, it is determined that the apparatus should be shifted to the specific power saving mode. This ensures the normal operation of the functional sections.

Next, a second embodiment of the present invention will be described. In the first embodiment, the network response priority button 501 and the power saving priority button 502 are always displayed in a selectable manner on the priority setting screen (FIG. 9). In contrast, in the second embodiment, there is shown an example in which one or both of the buttons 501 and 502 are made unselectable. Therefore, the second embodiment has the same basic configuration as the first embodiment, and hence different points from the first embodiment are mainly described with reference to FIGS. 15 to 19.

Figure 15:
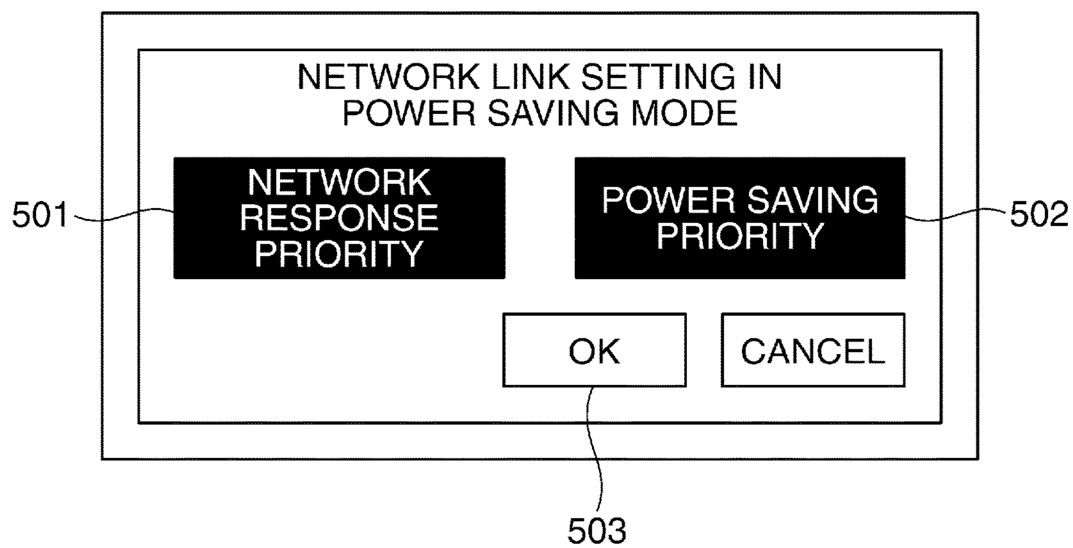
FIG. 15 is a view of the priority setting screen on which both a response priority button and a power saving priority button are made unselectable.

FIG. 15 is a view of the priority setting screen in a case where both the network response priority button 501 and the power saving priority button 502 are made unselectable. In this example, both the network response priority button 501 and the power saving priority button 502 are displayed grayed out, which means that the buttons are made unselectable. When causing the priority setting screen to be displayed, the UI processor 410 checks the power saving setting made by the power saving setting screen shown in FIG. 11. This check can be performed by obtaining the power saving setting stored in the NVRAM 213. When the power saving setting indicates that the power saving mode M3 has been selected by pressing the low-saving button 702, the image forming apparatus 101 is not shifted to either the power saving mode M4 or the power saving mode M5. Therefore, in this case, the UI processor 410 displays the priority setting screen not as shown in FIG. 9 but as shown in FIG. 15 in a state where the network response priority button 501 and the power saving priority button 502 are grayed out, thereby being made unselectable.

Figure 16:
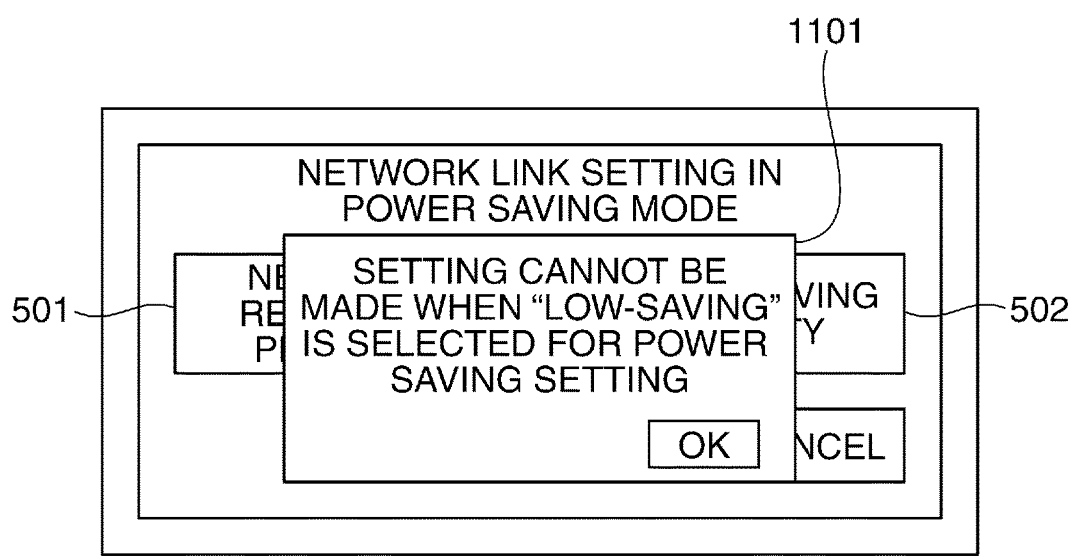
FIG. 16 is a view of the priority setting screen with a popup displayed thereon.

On the priority setting screen, in a case where the user pressed one of the buttons 501 and 502, there is displayed on a popup screen 1101, as shown in FIG. 16, information notifying to the effect that both the buttons 501 and 502 are made unselectable since the low-saving has been selected for the power saving setting. Thus, the fact that there is a priority option made unselectable and a reason for this are notified by display on screen.

Figure 17:
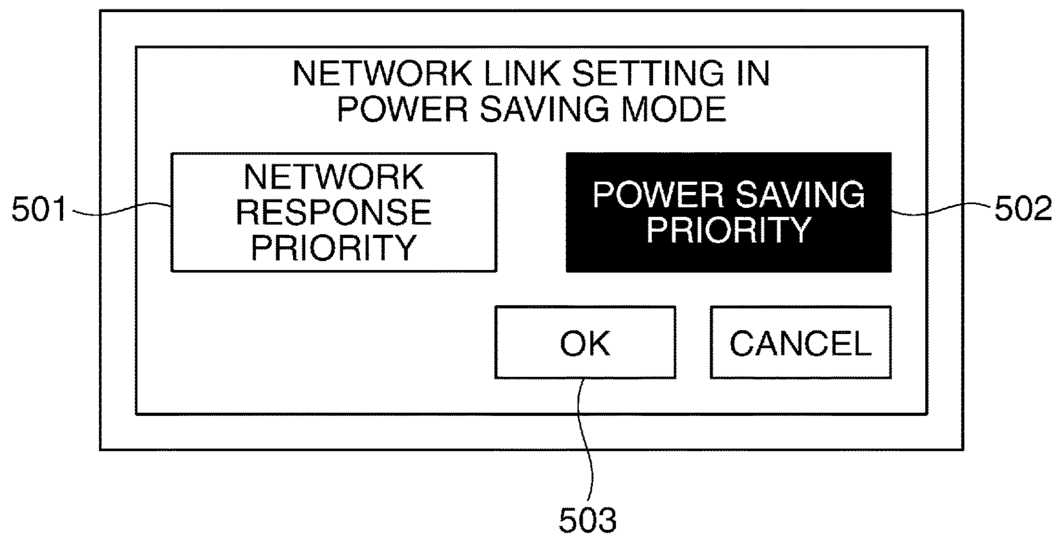
FIG. 17 is a view of the priority setting screen displayed on which the power saving priority button is made unselectable.

FIG. 17 is a view of a priority setting screen displayed when the power saving priority button 502 is made unselectable. Although in this example, only the power saving priority button 502 is displayed grayed out, thereby being made unselectable, the network response priority button 501 is made selectable. When causing the priority setting screen to be displayed, the UI processor 410 checks the connection state of the image controller and whether or not the SIP is operating in the NGN environment. When an image controller is externally connected or the SIP is operating in the NGN environment, the image forming apparatus 101 can be shifted to the power saving mode M4, but is not shifted to the power saving mode M5. Therefore, in this case, even when the power saving setting indicates that one of the specific power saving modes has been selected by pressing the high-saving button 701, the UI processor 410 displays the priority setting screen in a state where only the power saving priority button 502 is displayed grayed out, thereby being made unselectable (FIG. 17).

Figure 18:
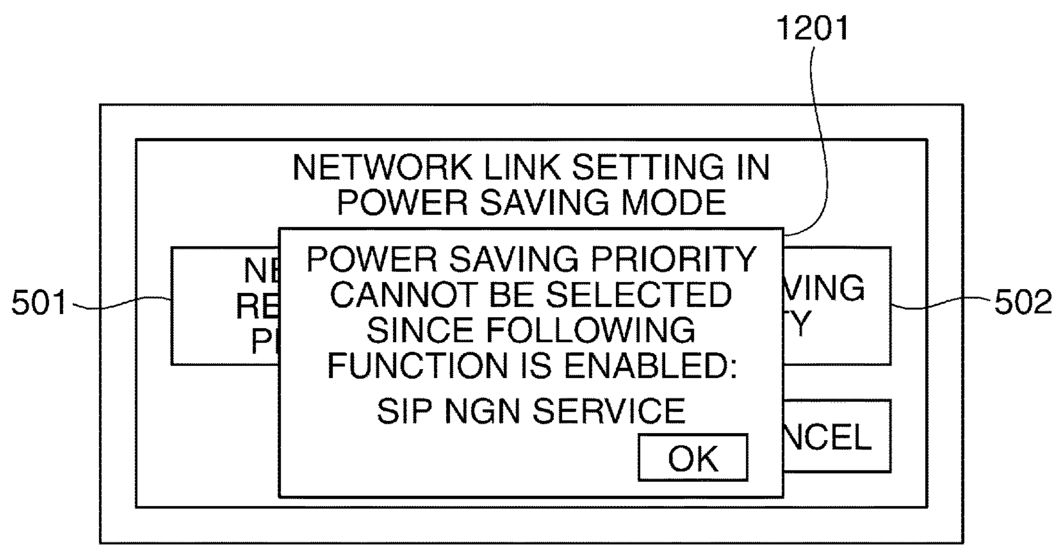
FIG. 18 is a view of the priority setting screen with a popup screen displayed thereon.

In a case where the user presses the power saving priority button 502 on the priority setting screen, there is displayed on a popup screen 1201, as shown in FIG. 18, information notifying to the effect that the power saving priority button 502 is made unselectable e.g. due to operation of the SIP. Thus, the fact that the power saving priority button 502 is made unselectable and a reason for this are notified by display on screen.

Figure 19:
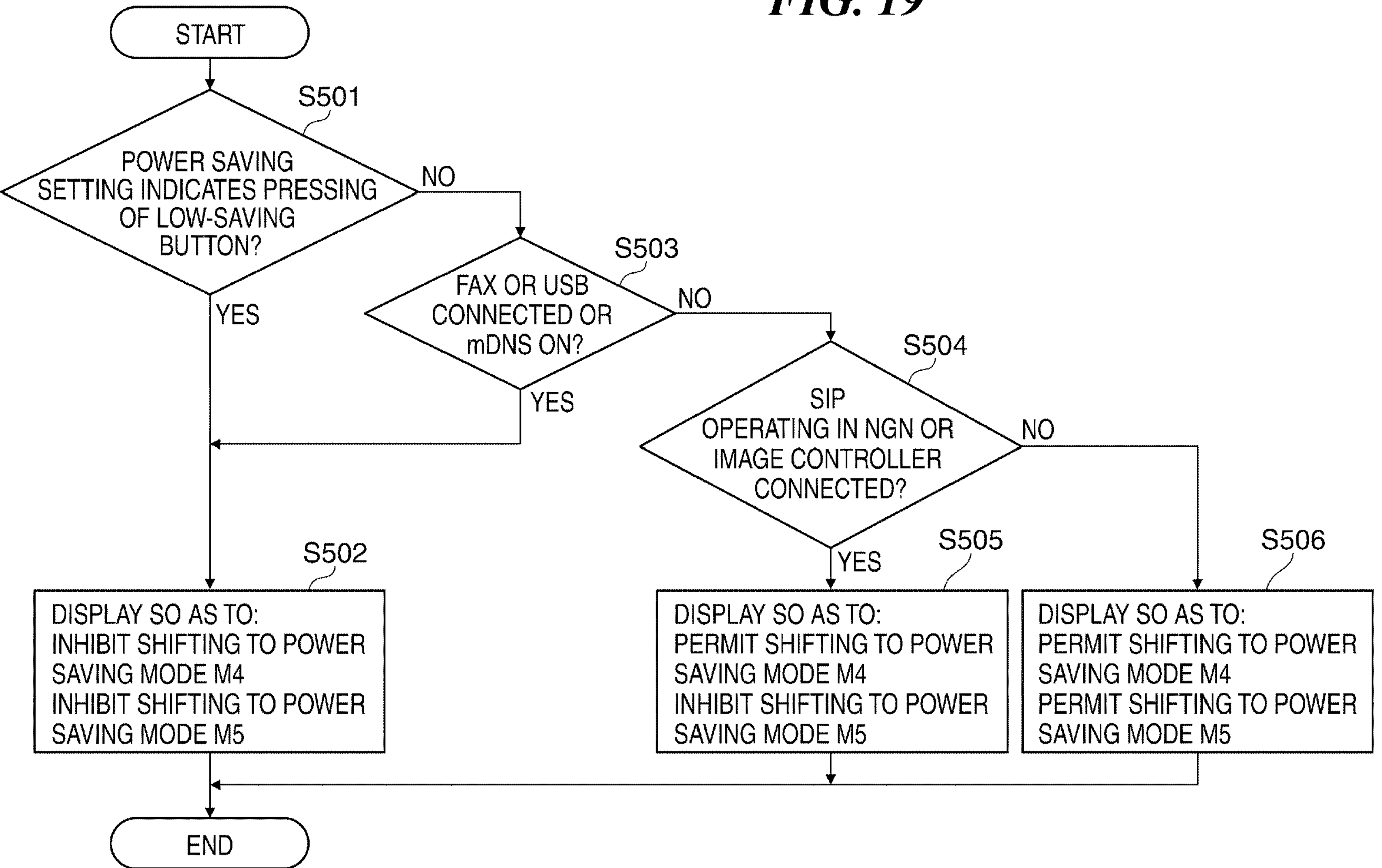
FIG. 19 is a flowchart of a process for displaying the priority setting screen.

FIG. 19 is a flowchart of a process for displaying the priority setting screen, which is performed by the UI processor 410. In a step S501, the UI processor 410 obtains the power saving setting stored in the NVRAM 213, and determines whether or not the power saving setting indicates that the low-saving button 702 has been pressed (the power saving mode M3 has been selected). If it is determined that the power saving setting indicates that the low-saving button 702 has been pressed, the image forming apparatus 101 cannot be shifted to either the power saving mode M4 or the power saving mode M5. This corresponds to a case where neither of the power saving modes M4 and M5 is included in the power modes indicated by the received power saving setting. Therefore, the UI processor 410 causes the priority setting screen to be displayed on which the buttons 501 and 502 are grayed out (step S502) (FIG. 15).

On the other hand, if it is determined that the power saving setting does not indicate that the low-saving button 702 has been pressed, this indicates that the high-saving button 701 has been selected. This corresponds to a case where both the power saving modes M4 and M5 are included in the power modes indicated by the received power saving setting. Therefore, the UI processor 410 proceeds to a step S503, and checks a state of use of the FAX, a state of use of the USB, and a state of use of the mDNS, to determine whether or not at least one of the FAX, the USB, and the mDNS is being used. That is, the UI processor 410 determines whether or not the operating environment of the image forming apparatus 101 is one in which at least one of the facsimile function, the USB function, and the mDNS function is being used. If it is determined that at least one of the functions is being used, the UI processor 410 causes the priority setting screen to be displayed on which both the buttons 501 and 502 are made unselectable (FIG. 15). However, when the user has pressed one of the buttons 501 and 502, the popup screen 1101 appearing in FIG. 16 is replaced by one displaying a message on the function in use.

On the other hand, if it is determined that none of the facsimile function, the USB function, and the mDNS function are used, in a step S504, the UI processor 410 checks whether or not the SIP is operating in the NGN environment and whether or not an image controller is operating (connected). If one of the SIP and the image controller is operating, the image forming apparatus 101 cannot be shifted to the power saving mode M5, so that in a step S505, the UI processor 410 causes the priority setting screen to be displayed on which the power saving priority button 502 is made unselectable (FIG. 17). On the other hand, if neither of the SIP and the image controller is operating in the NGN environment, the image forming apparatus 101 can be shifted to the power saving modes M4 and M5. Therefore, in a step S506, the UI processor 410 causes the priority setting screen to be displayed on which both the buttons 501 and 502 are made selectable (FIG. 9). After execution of the step S502, S505, or S506, the process in FIG. 19 is terminated.

According to the present embodiment, it is determined based on the power saving setting (FIG. 11) whether or not each of the buttons 501 and 502 is selectable on the priority setting screen (FIGS. 9, 15, or 17), and a priority option determined to be unselectable cannot be received. Particularly when the low-saving button 702 has been selected, both of the buttons 501 and 502 are made unselectable. On the other hand, when the high-saving button 701 has been selected, it is determined whether or not each of the buttons 501 and 502 is selectable, based on the power saving setting made by the user and the operating environment of the image forming apparatus 101. With these, it is possible to cause a user's will concerning a degree of power saving to be reflected on the selection of a specific power saving mode, and to set the specific power saving mode by taking the operating environment of the image forming apparatus 101 into account.

Further, when the buttons 501 and 502 are made unselectable on the priority setting screens, they are displayed grayed out, and hence it is possible to make the user aware of whether or not the buttons 501 and 502 are made selectable, by different displays. Note that from this viewpoint, it is only required to make the display of an unselectable state different from the display of a selectable state. In this case, the display of an unselectable state is not limited to a grayed-out display but it may be performed using a different color or a predetermined mark.

Further, when an attempt is made to select a priority option made unselectable, the fact that it is unselectable is notified by display on screen (FIGS. 16 and 18), and hence it is possible to notify the user of the fact that it is unselectable and a reason for this, by display on screen.

Note that in the first and second embodiments, from the viewpoint of simplifying the configuration and ensuring reflection of a user's will on the determination of a power saving mode, one or both of the steps S103 and S104 in the process in FIG. 10 may be eliminated. That is, one of the power saving modes M4 and M5 may be determined as an operating power mode, according to the result of determination in the step S105.

Further, from the same viewpoint, one or both of the steps S503 and S504 in FIG. 19 may be eliminated. Alternatively, in each of the steps S503 and S504, at least one of the elements or grounds for determination (e.g. the state of use of the FAX and whether or not the SIP is operating in the NGN environment) may be excluded.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-096511 filed May 11, 2015 which is hereby incorporated by reference herein in its entirety.

What is claimed is:

1. An image forming apparatus comprising:
- a printer;
- a scanner;
- a memory that stores programs; and
- a processor that executes the programs to:
  - when a first setting is set for the image forming apparatus as a power saving setting, disconnect a communication link and change a communication speed of the image forming apparatus to a lower speed when the image forming apparatus shifts to a specific power saving mode in which power is not supplied to at least the printer, the scanner, and the processor; and
  - when a second setting is set for the image forming apparatus as the power saving setting, not disconnect the communication link when the image forming apparatus shifts to the specific power saving mode.

2. The image forming apparatus according to claim 1, further comprising
- a display that displays a setting screen, through which either the first setting or the second setting is selected.

3. The image forming apparatus according to claim 1, wherein in a case where a predetermined external apparatus is connected to the image forming apparatus, it is determined, regardless of the power saving setting, not to disconnect the communication link when the image forming apparatus shifts to the specific power saving mode.

4. The image forming apparatus according to claim 3, wherein the predetermined external apparatus is an image controller.

5. The image forming apparatus according to claim 1, wherein, in a case where a predetermined operation setting is set for the image forming apparatus, it is determined, regardless of the power saving setting, not to disconnect the communication link when the image forming apparatus shifts to the specific power saving mode.

6. The image forming apparatus according to claim 5, wherein the predetermined operation setting is an operation setting of a session initiation protocol (SIP).

7. The image forming apparatus according to claim 1, wherein, in a case where a setting for permitting the shift to the specific power saving mode is set for the image forming apparatus, the image forming apparatus shifts to the specific power saving mode, and wherein, in a case where a setting for not permitting the shift to the specific power saving mode is set for the image forming apparatus, the image forming apparatus does not shift to the specific power saving mode.

8. A control method of controlling an image forming apparatus that includes a printer, a scanner, and a processor, the control method comprising:

when a first setting is set for the image forming apparatus as a power saving setting, disconnecting a communication link and changing a communication speed of the image forming apparatus to a lower speed when the image forming apparatus shifts to a specific power saving mode, in which power is not supplied to at least the printer, the scanner, and the processor; and when a second setting is set for the image forming apparatus as the power saving setting, not disconnecting the communication link when the image forming apparatus shifts to the specific power saving mode.

9. A non-transitory computer-readable storage medium for storing a control method of controlling an image forming apparatus that includes a printer, a scanner, and a processor, the control method comprising:

when a first setting is set for the image forming apparatus as a power saving setting, disconnecting a communication link and changing a communication speed of the image forming apparatus to a lower speed when the image forming apparatus shifts to a specific power saving mode, in which power is not supplied to at least the printer, the scanner, and the processor; and when a second setting is set for the image forming apparatus as the power saving setting, not disconnecting the communication link when the image forming apparatus shifts to the specific power saving mode.

* * * * *